US010794695B2

(12) United States Patent
Kitamura et al.

(10) Patent No.: US 10,794,695 B2
(45) Date of Patent: Oct. 6, 2020

(54) RANGE SENSOR

(71) Applicant: Murata Manufacturing Co., Ltd., Nagaokakyo-shi, Kyoto-fu (JP)

(72) Inventors: Tatsuya Kitamura, Nagaokakyo (JP); Hironari Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 407 days.

(21) Appl. No.: 15/784,277

(22) Filed: Oct. 16, 2017

(65) Prior Publication Data

US 2018/0045513 A1  Feb. 15, 2018

Related U.S. Application Data

(63) Continuation of application No. PCT/JP2016/054635, filed on Feb. 18, 2016.

(30) Foreign Application Priority Data

Jun. 24, 2015  (JP) .................................. 2015-126990

(51) Int. Cl.
*G01C 3/06* (2006.01)
*G01S 17/10* (2020.01)
(Continued)

(52) U.S. Cl.
CPC .............. *G01C 3/06* (2013.01); *G01S 7/4865* (2013.01); *G01S 17/10* (2013.01); *G01S 17/89* (2013.01); *H04N 5/353* (2013.01)

(58) Field of Classification Search
None
See application file for complete search history.

(56) References Cited

U.S. PATENT DOCUMENTS 6,501,506 B1   12/2002  Miura
7,009,690 B2*  3/2006   Kamon ................. G01S 7/4863
                                                                 356/3

(Continued)

FOREIGN PATENT DOCUMENTS

CN   102016636 A   4/2011
CN   102866404 A   1/2013
(Continued)

OTHER PUBLICATIONS

Official Communication issued in International Patent Application No. PCT/JP2016/054635, dated May 17, 2016.

*Primary Examiner* — Isam A Alsomiri
*Assistant Examiner* — Amir J Askarian
(74) *Attorney, Agent, or Firm* — Keating & Bennett, LLP

(57) ABSTRACT

A range sensor includes a light source, a light receiver, a controller, and a range information generator. The light source repeatedly emits illumination light onto a target. The light receiver receives light from the start of a time period during which the illumination light is emitted. The controller controls the light source and the light receiver so that each of the amounts of light received by the light receiver is cumulated in synchronization with emission of the illumination light. The range information generator generates range information indicating the range to the target based on the cumulative amounts of received light. The controller changes the cumulative number that is the number of cumulating operations in which the light receiver cumulates each of the amounts of received light, in accordance with the magnitudes of the cumulative amounts of received light.

16 Claims, 20 Drawing Sheets

(51) Int. Cl.
*G01S 17/89* (2020.01)
*G01S 7/4865* (2020.01)
*H04N 5/353* (2011.01)

(56) References Cited

U.S. PATENT DOCUMENTS

| | | | |
|---|---|---|---|
| 10,151,835 B2 * | 12/2018 | Ito | G01S 17/86 |
| 2001/0046317 A1 * | 11/2001 | Kamon | G06T 7/521 |
| | | | 382/154 |
| 2005/0051707 A1 | 3/2005 | Bamji et al. | |
| 2005/0162638 A1 | 7/2005 | Suzuki et al. | |
| 2006/0192938 A1 | 8/2006 | Kawahito | |
| 2007/0146682 A1 | 6/2007 | Tachino et al. | |
| 2008/0122933 A1 | 5/2008 | Murayama | |
| 2008/0231832 A1 * | 9/2008 | Sawachi | G01S 17/894 |
| | | | 356/5.1 |
| 2009/0141332 A1 * | 6/2009 | Futatsuya | G01J 1/4204 |
| | | | 359/276 |
| 2010/0230599 A1 | 9/2010 | Yamaguchi et al. | |
| 2011/0037969 A1 | 2/2011 | Spickermann et al. | |
| 2011/0051118 A1 | 3/2011 | Sato et al. | |
| 2011/0157354 A1 | 6/2011 | Kawahito | |
| 2013/0010278 A1 | 1/2013 | Ohmuro | |
| 2013/0229645 A1 | 9/2013 | Suzuki et al. | |
| 2014/0071180 A1 * | 3/2014 | Shin | G09G 5/10 |
| | | | 345/690 |
| 2014/0327903 A1 | 11/2014 | Mase et al. | |
| 2015/0285623 A1 * | 10/2015 | Tachibana | G01S 7/4865 |
| | | | 250/341.8 |
| 2016/0150165 A1 * | 5/2016 | Grauer | H01L 27/14609 |
| | | | 348/280 |
| 2016/0161611 A1 * | 6/2016 | Ito | G01S 17/003 |
| | | | 356/51 |
| 2016/0320486 A1 * | 11/2016 | Murai | G01S 17/10 |
| 2016/0344965 A1 * | 11/2016 | Grauer | H04N 5/35536 |
| 2016/0373652 A1 * | 12/2016 | Ando | A61B 5/4064 |
| 2019/0072673 A1 * | 3/2019 | Ito | G01S 17/10 |

FOREIGN PATENT DOCUMENTS

| | | |
|---|---|---|
| JP | 06-109449 A | 4/1994 |
| JP | 10-322599 A | 12/1998 |
| JP | 2004-245780 A | 9/2004 |
| JP | 2004-294420 A | 10/2004 |
| JP | 2005-214743 A | 8/2005 |
| JP | 2006-523074 A | 10/2006 |
| JP | 2007-132848 A | 5/2007 |
| JP | 2007-170856 A | 7/2007 |
| JP | 2008-008700 A | 1/2008 |
| JP | 2008-209162 A | 9/2008 |
| JP | 2009-047659 A | 3/2009 |
| JP | 4235729 B2 | 3/2009 |
| JP | 2010-032425 A | 2/2010 |
| JP | 2010-071832 A | 4/2010 |
| JP | 2010-216933 A | 9/2010 |
| JP | 2011-107628 A | 6/2011 |
| JP | 2011-128024 A | 6/2011 |
| JP | 2013-137237 A | 7/2013 |
| JP | 2013-137242 A | 7/2013 |
| JP | 2013-170962 A | 9/2013 |
| JP | 2014-006212 A | 1/2014 |

* cited by examiner

FIG. 5A  EMISSION CONTROL SIGNAL FOR LED LIGHT 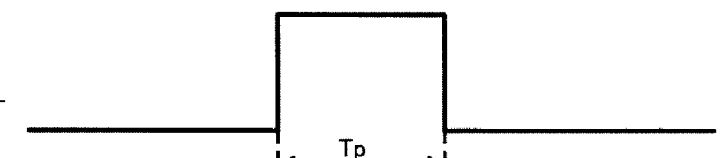
FIG. 5B  REFLECTED LIGHT FROM TARGET 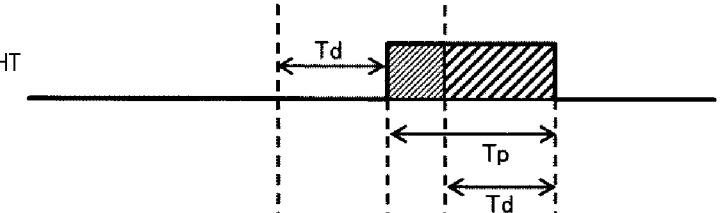
FIG. 5C  FIRST GATE SIGNAL Sg1 
FIG. 5D  SECOND GATE SIGNAL Sg2 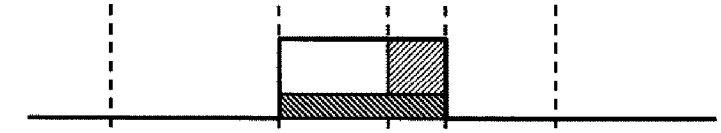
FIG. 5E  THIRD GATE SIGNAL Sg3 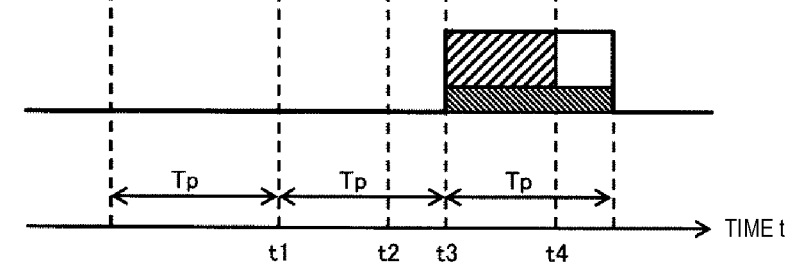

FIG. 6A    FIG. 6B    FIG. 6C
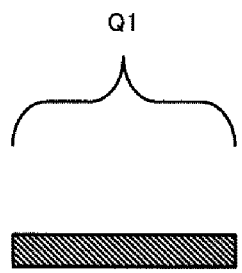
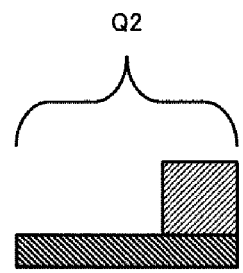
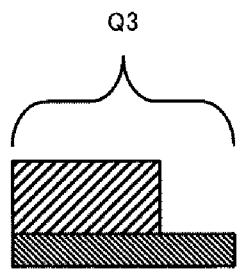
FIG. 6D
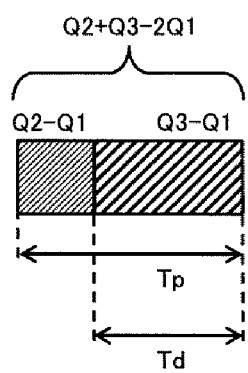

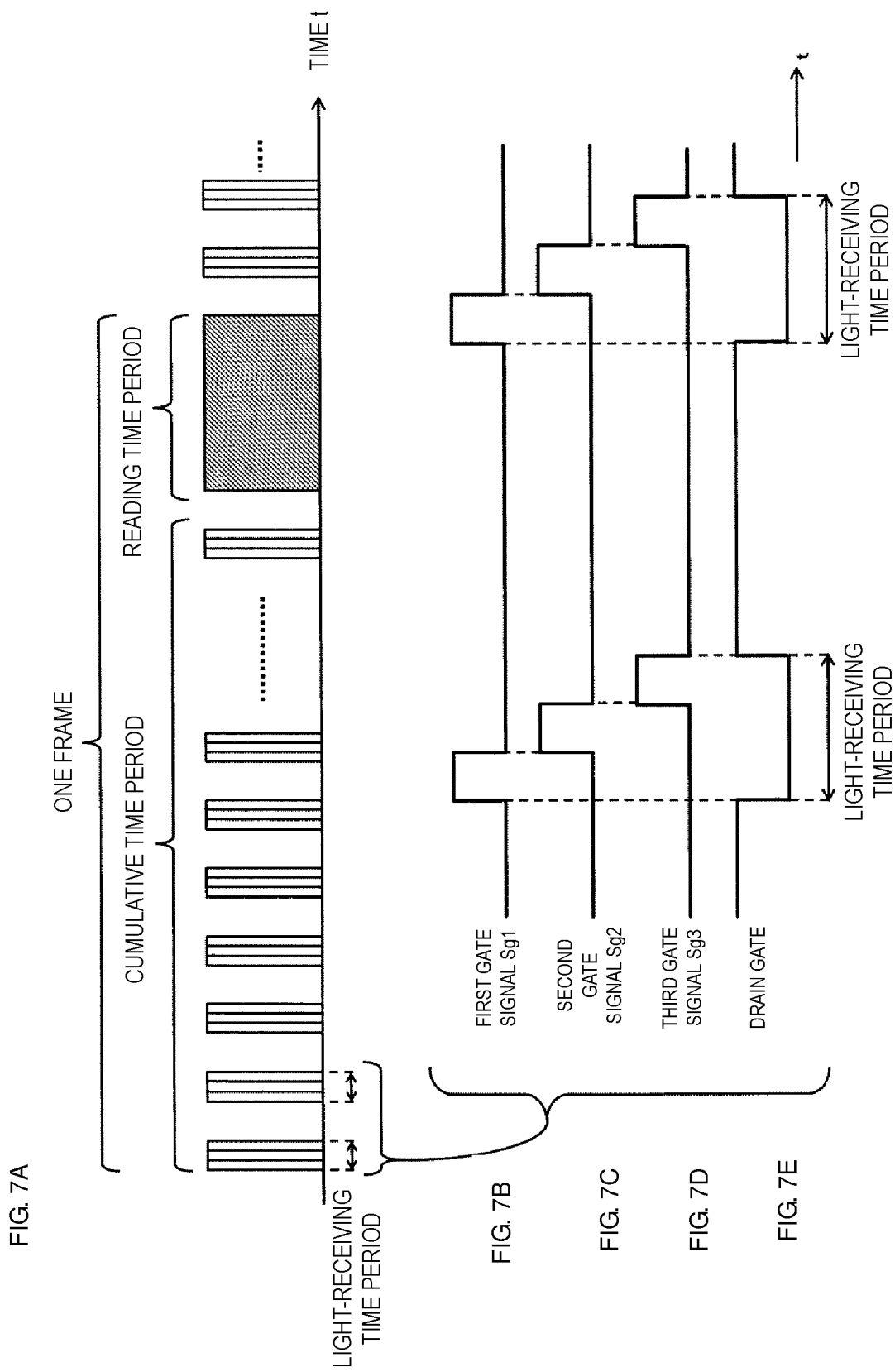

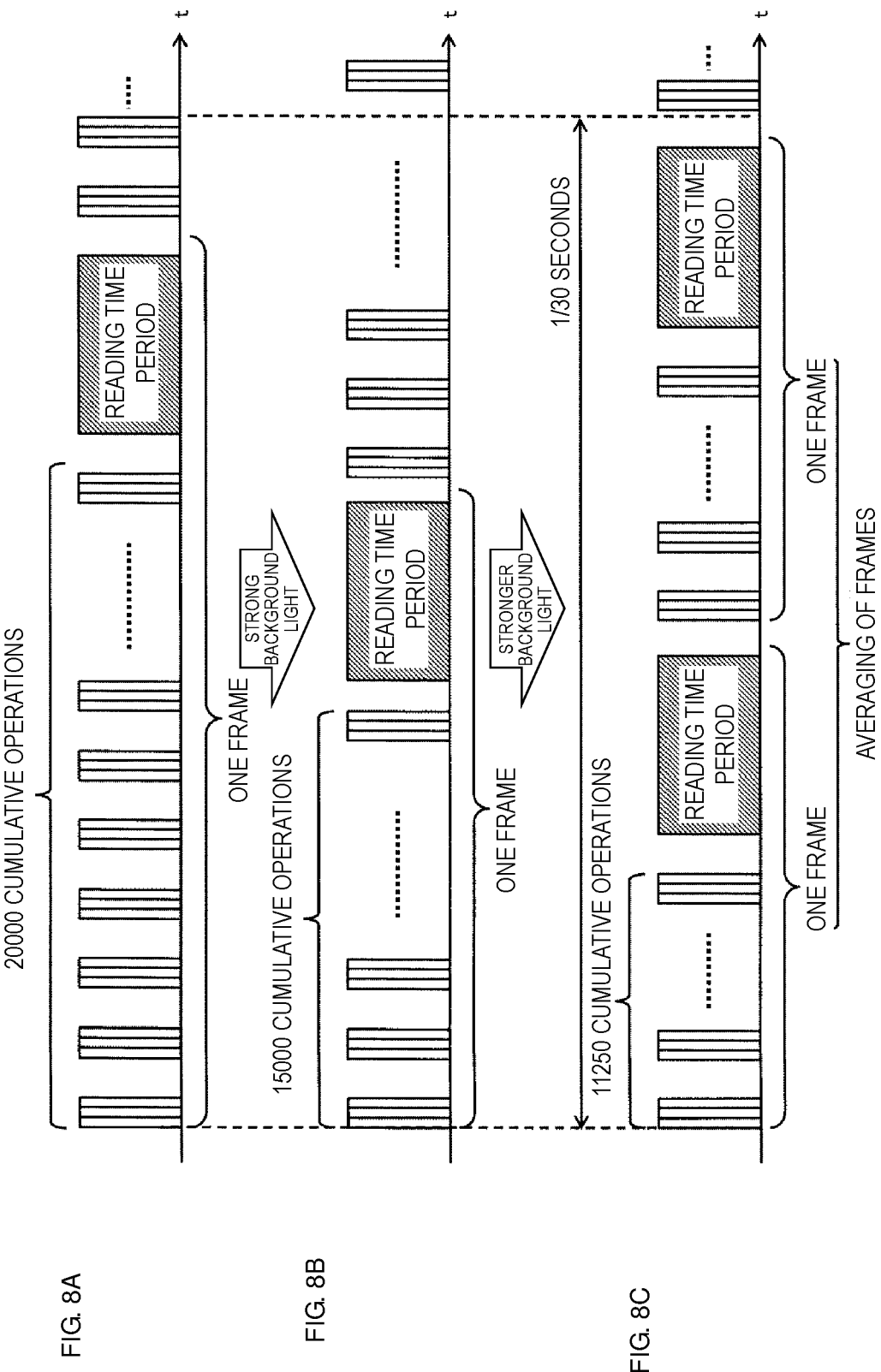

FIG. 10A

| | MODE | CUMULATIVE NUMBER [TIMES] | AVERAGING SETTING FLAG | THE NUMBER OF FRAMES TO BE AVERAGED | FRAME RATE BEFORE AVERAGING [fps] | FRAME RATE AFTER AVERAGING [fps] |
|---|---|---|---|---|---|---|
| ↑ REDUCTION IN CUMULATIVE NUMBER / INCREASE IN CUMULATIVE NUMBER ↓ | 1 | 20000 | OFF (NOT TO BE AVERAGED) | – | 40.9 | – |
| | 2 | 16000 | OFF (NOT TO BE AVERAGED) | – | 48.8 | – |
| | 3 | 12000 | ON (TO BE AVERAGED) | 2 | 60.7 | 30.4 |
| | 4 | 8000 | ON (TO BE AVERAGED) | 2 | 80.1 | 40.1 |
| | 5 | 4000 | ON (TO BE AVERAGED) | 3 | 117.9 | 39.3 |

| PIXEL | RANGE DATA FOR FIRST FRAME [cm] | RANGE DATA FOR SECOND FRAME [cm] | RANGE DATA AFTER AVERAGING [cm] |
|---|---|---|---|
| (x1,y1) | 30.6 | 32.4 | 31.5 |
| (x2,y2) | 32.0 | 31.2 | 31.6 |
| (x3,y3) | 31.5 | 30.7 | 31.1 |
| ⋮ | ⋮ | ⋮ | ⋮ |

FIG. 14

| CONDITION | CUMULATIVE NUMBER [TIMES] | TO BE AVERAGED | FRAME RATE [fps] | MEASURED COUNT VALUE/SATURATION COUNT VALUE [%] | RANGE STANDARD DEVIATION [mm] |
|---|---|---|---|---|---|
| A | 20000 | NOT TO BE AVERAGED | 41 | 10% | 12.9 |
| B | 12000 | NOT TO BE AVERAGED | 60 | 5% | 18.7 |
| C | 12000 | AVERAGING OF TWO FRAMES | 30 | 5% | 14.4 |

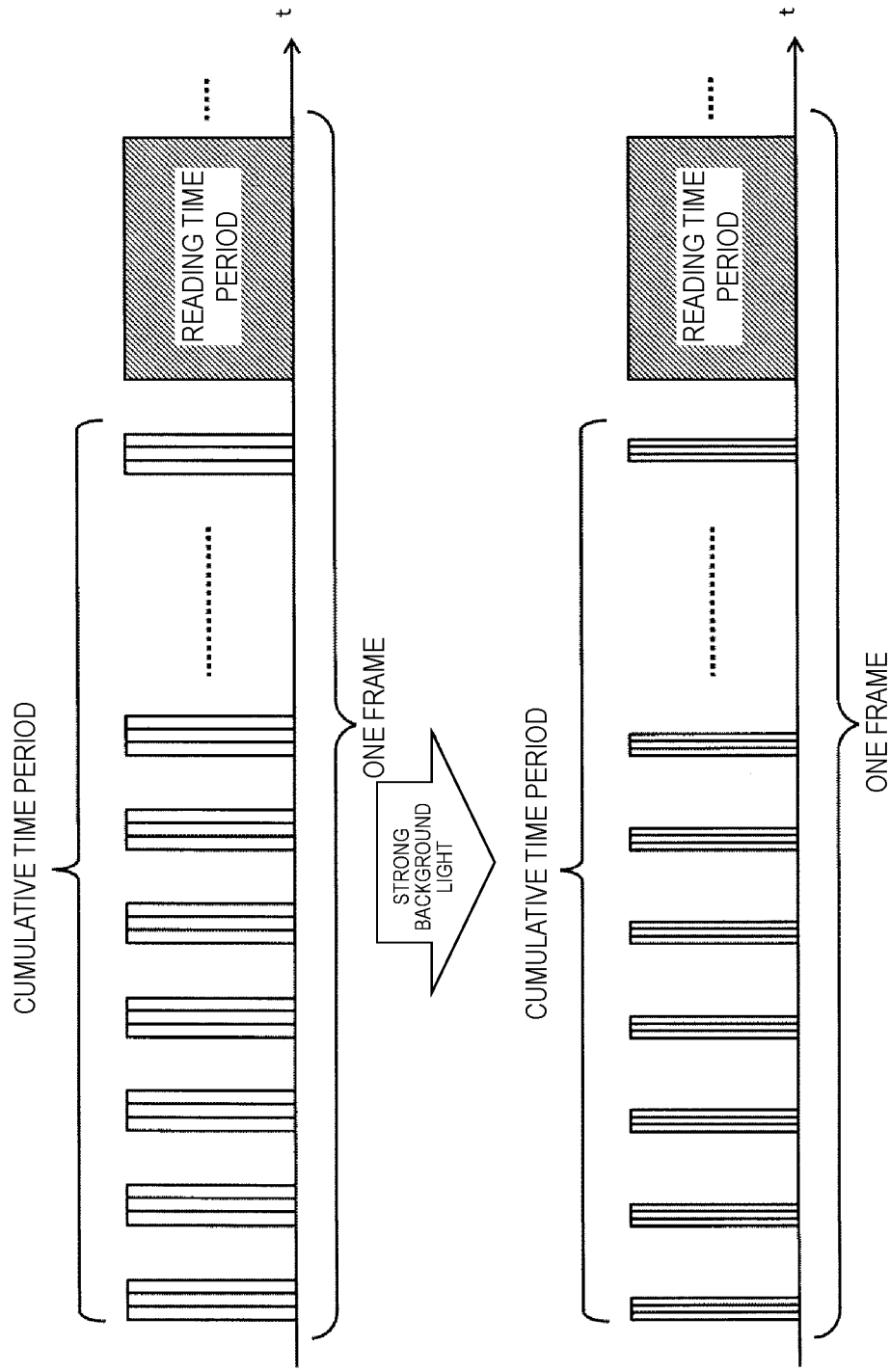

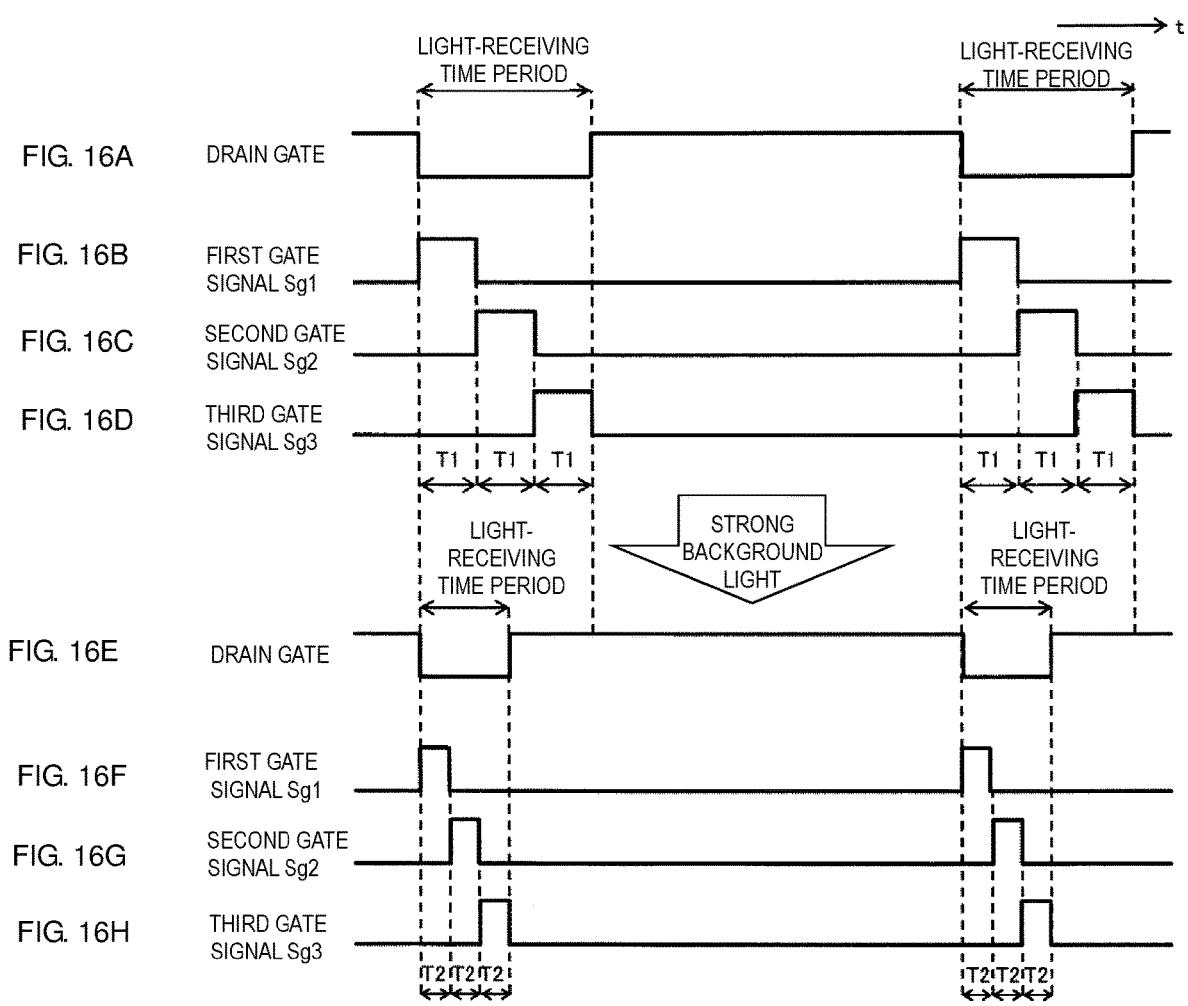

FIG. 17A LED LIGHT
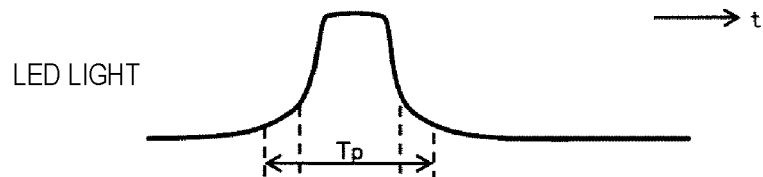
FIG. 17B REFLECTED LIGHT
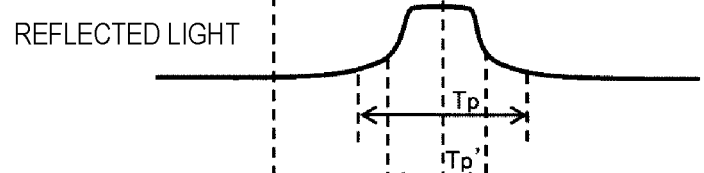
FIG. 17C SECOND GATE SIGNAL Sg2
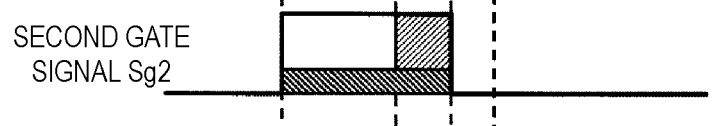
FIG. 17D THIRD GATE SIGNAL Sg3
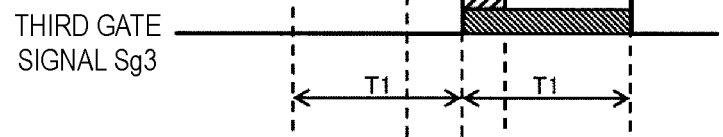
FIG. 17E SECOND GATE SIGNAL Sg2
FIG. 17F THIRD GATE SIGNAL Sg3
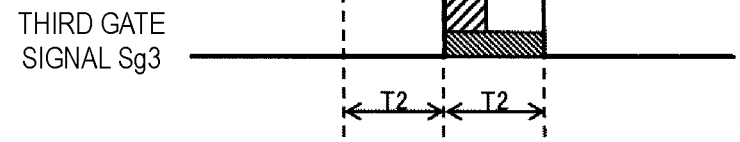

RANGE SENSOR

CROSS REFERENCE TO RELATED APPLICATIONS

This application claims the benefit of priority to Japanese Patent Application No. 2015-126990 filed on Jun. 24, 2015 and is a Continuation Application of PCT Application No. PCT/JP2016/054635 filed on Feb. 18, 2016. The entire contents of each application are hereby incorporated herein by reference.

BACKGROUND OF THE INVENTION

1. Field of the Invention

The present invention relates to a range sensor that measures a range to a target.

2. Description of the Related Art

Range image sensors are among range sensors that measure the range to a target. Such range image sensors generate a range image by using a TOF (Time-Of-Flight) system in which an object including a target is illuminated with light and in which the range is measured based on a time period during which the reflected light is propagated. In the range image sensors using the TOF system, background light from the outside causes trouble in range measurement using reflected light of emitted light. Japanese Patent No. 4235729 discloses a range image sensor, for which removal of background light is considered, for range measurement using a TOF system.

The range image sensor described in Japanese Patent No. 4235729 includes three nodes (capacities), in which charge is accumulated, for each pixel circuit. Timings at which two of the nodes receive light are set so that a ratio of charge distribution is changed in accordance with a delay of reflected light of light having been subjected to pulse modulation for emission. A timing at which emission of light is always in the OFF state is set to the remaining node. Thus, the remaining node accumulates only the amount of received background light. By using this, a background light component is subtracted from a signal including information about a delay of reflected light so that an effect of background light is removed.

In Japanese Patent No. 4235729, three capacities of a pixel circuit are used to accumulate the amount of received background light and the amount of received reflected light. Then, the background light component is subtracted by given signal processing. However, when the amount of received light accumulated with strong background light, such as sunlight, is increased, even if the background light component is subtracted, there remains the effect of optical shot noise that is statistical noise proportional to the square root of the accumulated amount of received light. In addition, under a condition of excessively strong background light, the amounts of received light which are accumulated in the capacities of a pixel circuit are saturated, resulting in failure in calculation for range measurement. Thus, a range sensor of the related art has a problem in that accuracy of measurement of a range is reduced under a condition of strong background light.

SUMMARY OF THE INVENTION

Preferred embodiments of the present invention provide range sensors that reduce or prevent a reduction in accuracy of measurement of a range under a condition of strong background light, which is caused in range information indicating the range to a target.

A range sensor according to a preferred embodiment of the present invention includes a light source, a light receiver, a controller, and a range information generator. The light source repeatedly emits illumination light onto a target. The light receiver receives light during a given time period from the start of an emission time period of the illumination light. The controller controls the light source and the light receiver such that the amount of light received by the light receiver is cumulated in synchronization with emission of the illumination light. The range information generator generates, based on the cumulative amount of received light, range information indicating the range to the target. The controller changes a cumulative number in accordance with the magnitude of the cumulative amount of received light. The cumulative number is the number of cumulating operations in which the light receiver cumulates the amount of received light.

A range sensor according to a preferred embodiment of the present invention changes the cumulative number in accordance with the magnitude of the cumulative amount of received light which is cumulated by the light receiver. Thus, excessive cumulation of the amount of received light under a condition of strong background light may be prevented, so as to significantly reduce or prevent a reduction in accuracy of measurement of a range.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A to 5E include timing charts of operation timings at which light is emitted and received in the range image sensor.

FIGS. 6A to 6D include schematic diagrams for describing a method for calculating a range, which is performed by the range image sensor.

FIGS. 7A to 7E include diagrams for describing operations of generating a range image, which are performed by the range image sensor.

FIGS. 8A to 8C include diagrams for describing operations that are performed by the range image sensor in accordance with a change in background light.

FIGS. 10A and 10B include diagrams for describing a process of generating a range image, according to the first preferred embodiment of the present invention.

FIG. 14 is a table illustrating conditions and results of the experiment using a range image sensor according to a preferred embodiment of the present invention.

FIGS. 15A and 15B include diagrams for describing operations of generating a range image, according to a second preferred embodiment of the present invention.

FIGS. 16A to 16H include timing charts of various signals which are used before and after a reduction of a light-receiving time period.

FIGS. 17A to 17F include diagrams for describing a reduction of the light-receiving time period which is performed by the range image sensor according to the second preferred embodiment of the present invention.

DETAILED DESCRIPTION OF THE PREFERRED EMBODIMENTS

Range image sensors according to preferred embodiments of the present invention will be described below with reference to the attached drawings.

Preferred embodiments of the present invention are merely exemplary. A portion of the configuration in a preferred embodiment may be replaced or combined with that of a different preferred embodiment. In a second preferred embodiment and its subsequent preferred embodiments of the present invention, points in common with those in a first preferred embodiment will not be described, and only different points will be described. In particular, similar effects produced with a similar configuration will not be described in individual preferred embodiments.

First Preferred Embodiment

Figure 1:
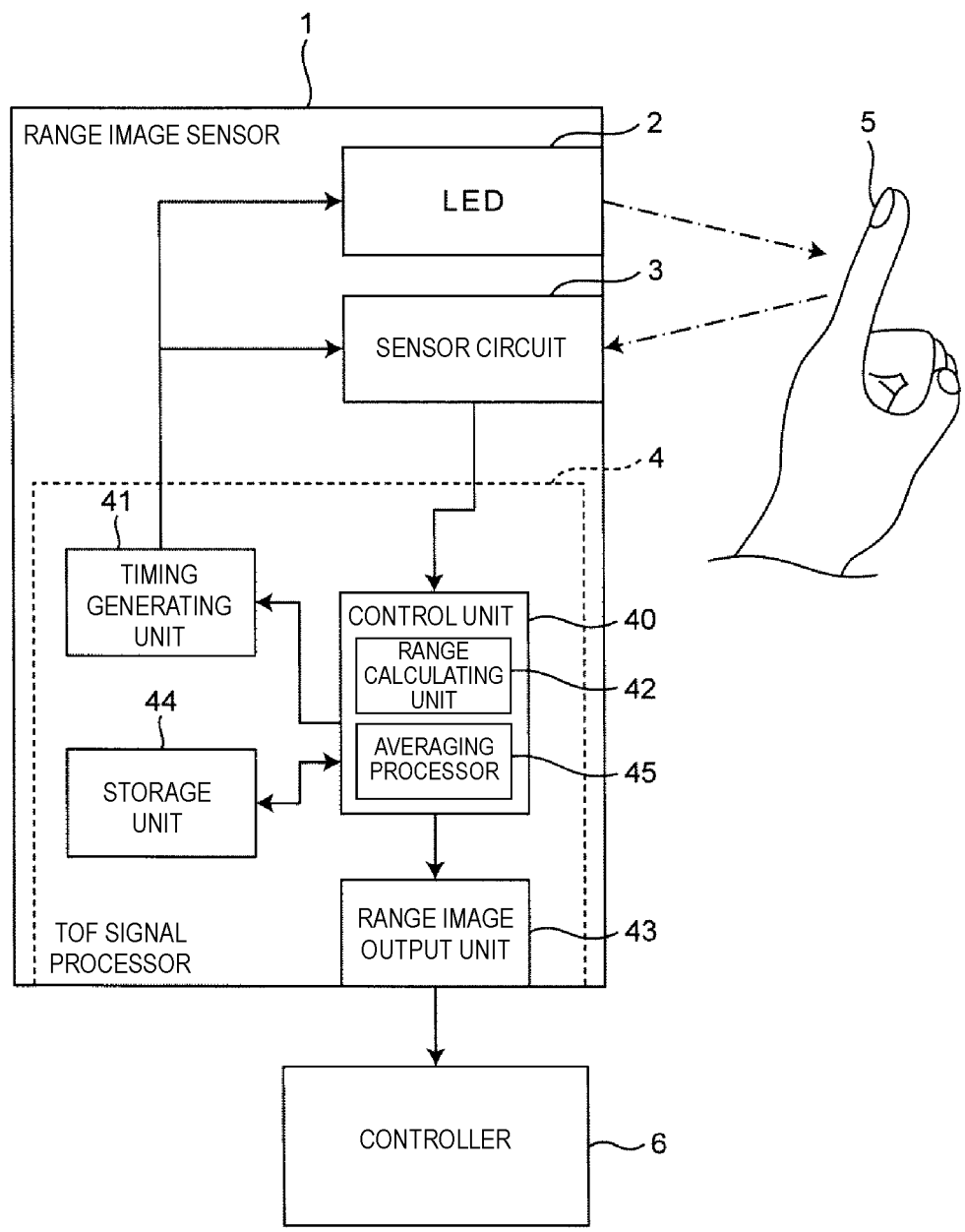
FIG. 1 is a block diagram illustrating a range image sensor according to a first preferred embodiment of the present invention.
Figure 2A:
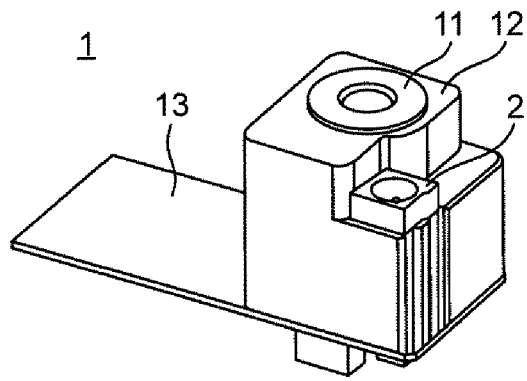
FIGS. 2A and 2B include a perspective view of the range image sensor and a perspective view for describing how to assemble the range image sensor.
Figure 2B:
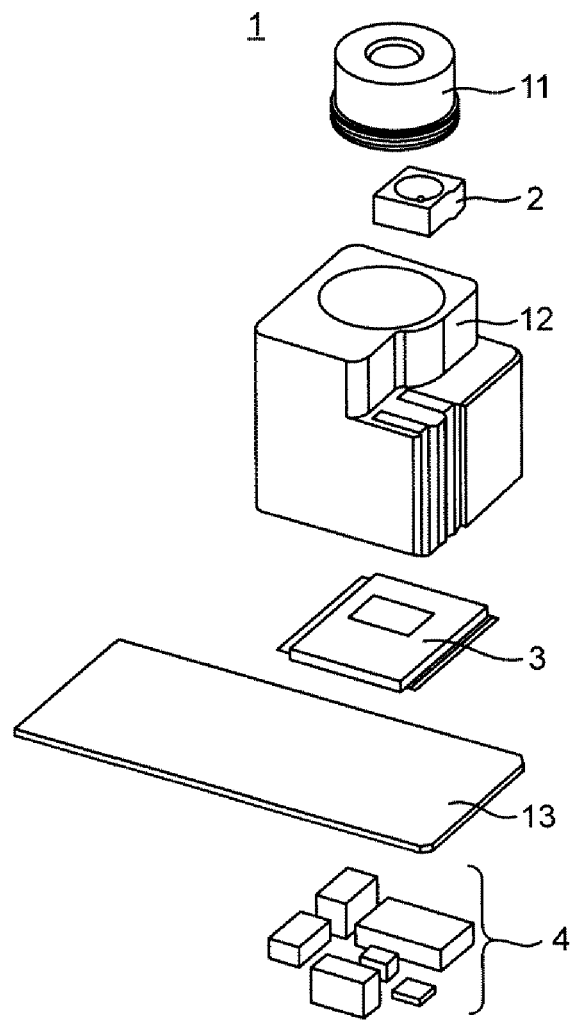

The configuration of a range image sensor according to a first preferred embodiment of the present invention will be described with reference to FIGS. 1, 2A, and 2B. FIG. 1 is a block diagram illustrating the configuration of the range image sensor according to the first preferred embodiment. FIG. 2A is a perspective view of the range image sensor. FIG. 2B is an exploded view of the range image sensor in FIG. 2A.

As illustrated in FIG. 1, a range image sensor 1 according to the present preferred embodiment includes a LED (light-emitting diode) 2, a sensor circuit 3, and a TOF signal processor 4. The range image sensor 1 is a sensor device that measures a range by using a TOF system, and is an exemplary range sensor that generates a range image as range information indicating the range to a target 5. The range image sensor 1 mounted, for example, in a mobile device or an information terminal outputs a range image that is to be used by a host, such as a controller 6 detecting a user's hand or other object as the target 5. The range image sensor 1 emits light from the LED 2, receives reflected light from the target 5 by the sensor circuit 3, and uses the TOF signal processor 4 to generate a range image indicating the range to the target 5. In the present preferred embodiment, the range image sensor 1 and the controller 6 define a user interface system that detects a user operation performed on a device in which the range image sensor 1 and the controller 6 are mounted.

As illustrated in FIGS. 2A and 2B, the range image sensor 1 includes a lens 11, a holder 12, and a circuit board 13.

As illustrated in FIG. 2A, the LED 2 is preferably attached to the outer surface of the holder 12. The LED 2 emits light in an infrared-region wavelength zone (hereinafter referred to as "LED light") towards the outside of the holder 12. The LED light is subjected to pulse modulation for emission under control of the TOF signal processor 4. The LED 2 is an exemplary light source that emits light having a given wavelength zone, as illumination light and that stops the emission.

The sensor circuit 3 preferably includes a CMOS (complementary metal oxide semiconductor) image sensor circuit including a light-receiving surface. As illustrated in FIG. 2B, the sensor circuit 3 is preferably integrated into a single semiconductor chip, and is attached to the circuit board 13 inside the holder 12. The lens 11, such as a barrel lens, for example, is attached to the outer surface of the holder 12 so as to cover the light-receiving surface of the sensor circuit 3. The lens 11 condenses light emitted from the outside of the holder 12, onto the light-receiving surface of the sensor circuit 3. The sensor circuit 3 is an exemplary light receiver that receives light in synchronization with emission of LED light. The configuration of the sensor circuit 3 will be described in detail below.

The TOF signal processor 4 preferably includes a circuit that performs various types of signal processing to generate a range image by using a TOF system, and includes a controller 40, a timing generator 41, a range image output circuit 43, and a storage 44. The TOF signal processor 4 preferably includes, for example, an ASIC (application-specific integrated circuit) or a FPGA (field programmable gate array), and is integrated into the circuit board 13.

In the TOF signal processor 4, the controller 40 preferably includes, for example, a logic circuit, and controls various circuits included in the TOF signal processor 4. The controller 40 includes a range calculator 42 and an averaging processor 45.

The timing generator 41 preferably includes an oscillation circuit, and generates a timing signal having a given period. The timing generator 41 supplies the LED 2 with the generated timing signal as an emission control signal to emit LED light having been subjected to pulse modulation. The timing generator 41 supplies the sensor circuit 3 with the generated timing signal, and exerts synchronous control on emission from the LED 2 and reception of light in the sensor circuit 3. Operation timings of emission and reception of light in the range image sensor 1 will be described below. The timing generator 41 may preferably be integrated into the sensor circuit 3, and the sensor circuit 3 may preferably exert control on pulse modulation of LED light emitted from the LED 10.

The range calculator 42 preferably includes an operation circuit that performs four operations and other suitable operations. Based on a detection result of reflected light which is obtained by the sensor circuit 3, the range calculator 42 calculates a range based on a propagation time period of received reflected light. The method of calculating a range will be described below. The range calculator 42 calculates a range for each pixel, and, for example, records, in the storage 44, range data indicating the calculated range for the pixel. The range calculator 42 calculates range data for all of the pixels so that a range image is generated. The range calculator 42 is an exemplary range information generator that generates a range image as range information.

The range image output circuit 43 preferably includes an interface circuit that outputs information to an external device. The range image output circuit 43 outputs the range image generated by the range calculator 42, to an external device, such as the controller 6. The range image output circuit 43 may output pieces of range data for all of the pixels which are recorded in the storage 44, or may output range data calculated by the range calculator 42 one by one.

The storage 44 is preferably a storage medium that stores various types of information, such as data and parameters, to implement the functions of the range image sensor 1. The storage preferably includes, for example, a flash memory. In the storage 44, for example, a table in which various parameters to generate a range image for one frame are associated with the number of frames for which range images are averaged is recorded (see FIGS. 10A and 10B).

The averaging processor 45 preferably includes, for example, an operation circuit. The averaging processor 45 records image data indicating a range image for a given frame in the storage 44, and averages range images for multiple recorded frames. The averaging operation on range images will be described below in detail.

On the host side, the controller 6 preferably includes, for example, a CPU or an MPU. The controller 6 includes an internal memory defined, for example, by a flash memory and a ROM, and executes given programs recorded in the internal memory so as to implement various functions. The controller 6 exerts, for example, display control on a device in which the controller 6 is mounted. The controller 6 detects a target, such as the hand 5, based on range images from the range image sensor 1, and determines a user operation performed on a mobile device or an information terminal in which the controller 6 is mounted. The controller 6 is an exemplary processing device that performs given processing based on range images generated by the range image sensor 1.

Figure 3:
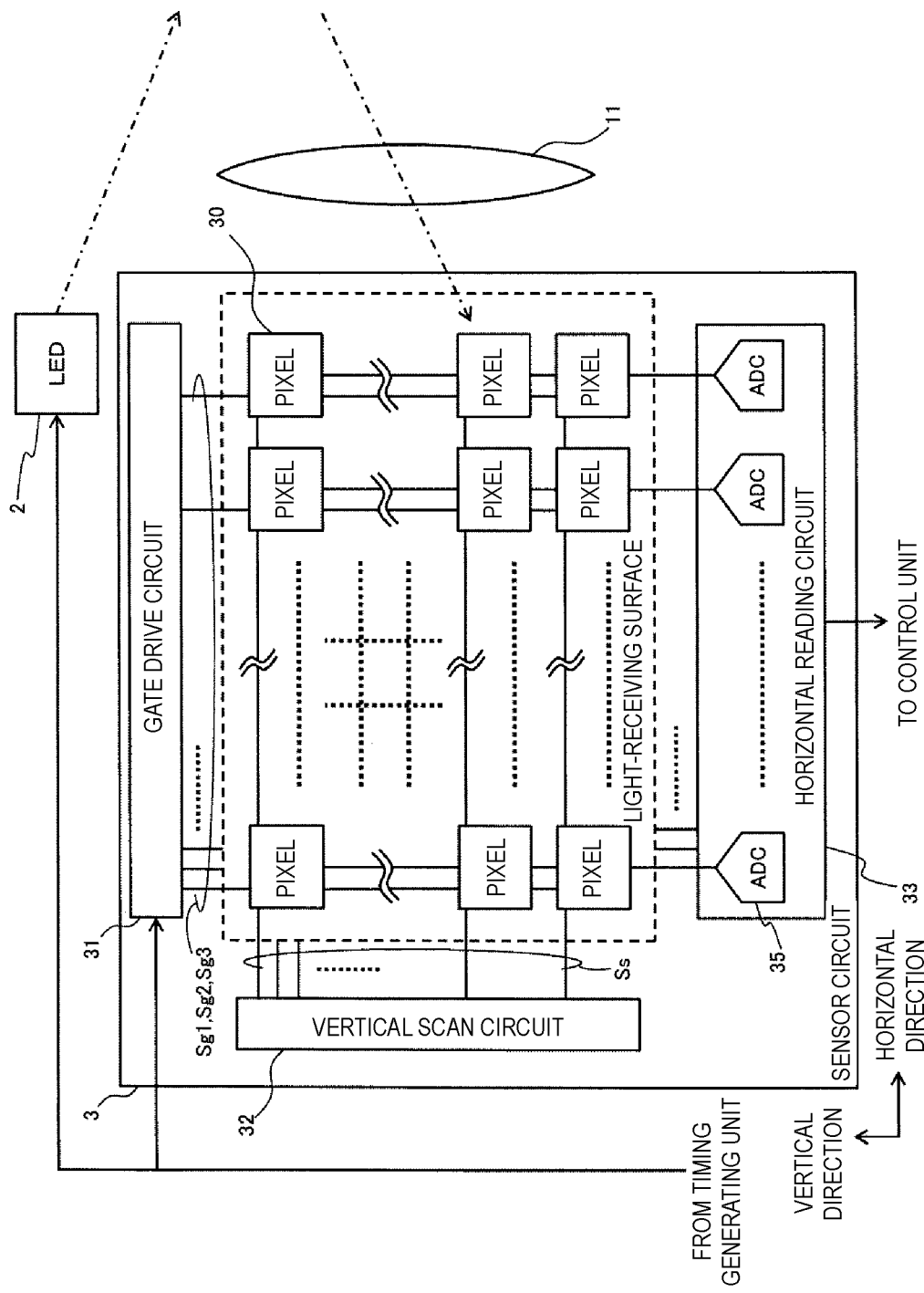
FIG. 3 is a block diagram illustrating an exemplary configuration of a sensor circuit in the range image sensor.
Figure 4A:
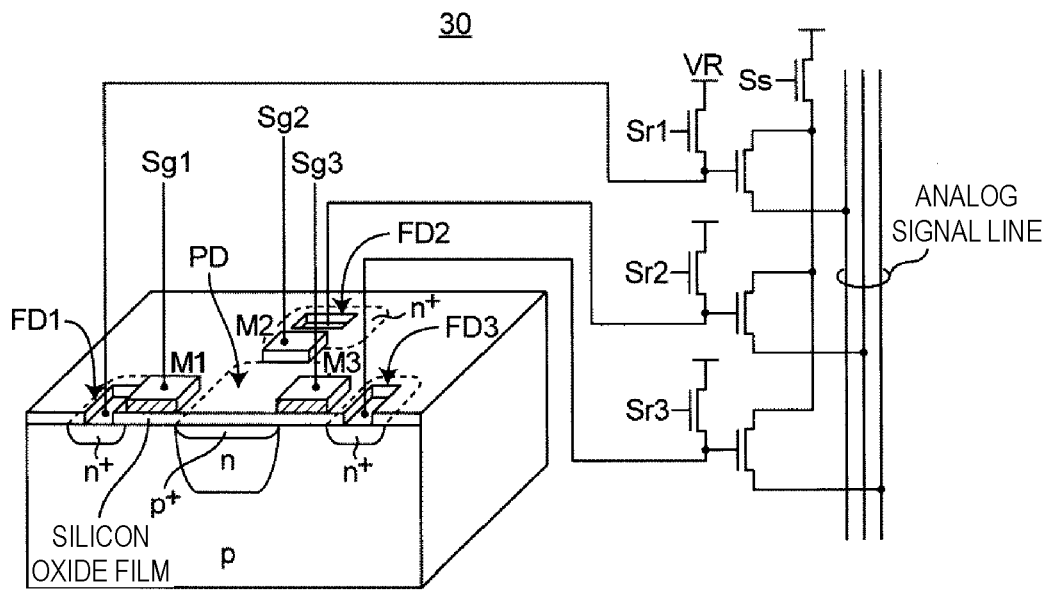
FIGS. 4A and 4B include schematic diagrams illustrating an exemplary configuration of a pixel circuit in the sensor circuit.
Figure 4B:
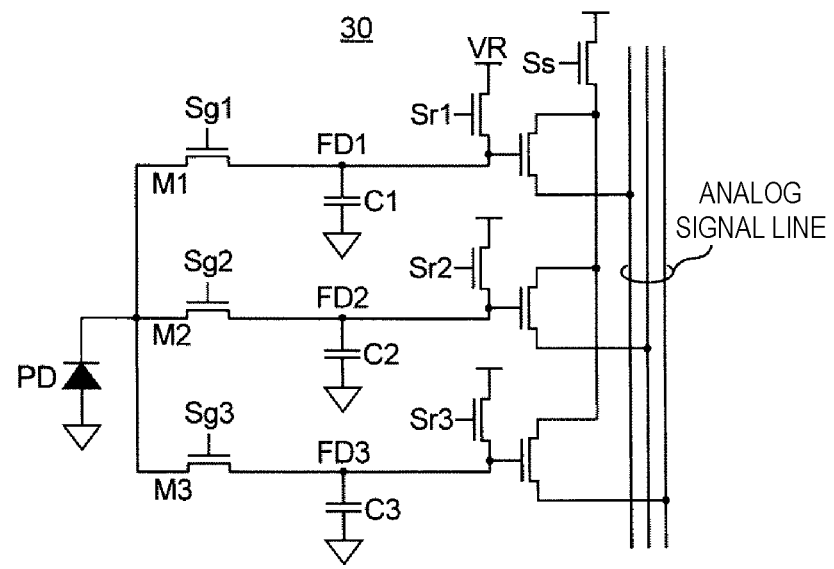

The configuration of the sensor circuit 3 will be described in detail with reference to FIGS. 3, 4A, and 4B. FIG. 3 is a block diagram illustrating the configuration of the sensor circuit 3 in the range image sensor 1. FIGS. 4A and 4B include schematic diagrams illustrating the configuration of a pixel circuit in the sensor circuit 3.

As illustrated in FIG. 3, the sensor circuit 3 preferably includes multiple pixel circuits 30 and peripheral circuits, such as a gate drive circuit 31, a vertical scan circuit 32, and a horizontal reading circuit 33. In the present preferred embodiment, the sensor circuit 3 preferably utilizes a charge distribution system.

The gate drive circuit 31 is a drive circuit that drives various MOS transistors included in the pixel circuits 30 based on a timing signal from the timing generator 41 (see FIG. 1). The gate drive circuit 31 sequentially outputs first, second, and third gate signals Sg1, Sg2, and Sg3 to a pixel circuit 30. Each of the first, second, and third gate signals Sg1, Sg2, and Sg3 is output to the multiple pixel circuits 30 at the same timing.

The multiple pixel circuits 30 are disposed in a matrix in the horizontal direction and the vertical direction on the light-receiving surface. The pixel circuits 30 are exemplary pixels in the light receiver of the range image sensor. FIG. 4A is a schematic diagram illustrating a pixel circuit 30 laminated onto the semiconductor chip. FIG. 4B is a circuit diagram illustrating an equivalent circuit of that in FIG. 4A.

As illustrated in FIG. 4A, the pixel circuit 30 includes a photodiode PD and three floating diffusions FD1, FD2, and FD3. The pixel circuit 30 preferably has a configuration in which the photodiode PD is embedded in a p-type semiconductor substrate and in which the three floating diffusions FD1, FD2, and FD3 are disposed around the photodiode PD. Further, MOS transistors M1, M2, and M3 are provided between a region in which the photodiode PD is located and the floating diffusions FD1, FD2, and FD3, respectively.

As illustrated in FIG. 4B, capacitors C1, C2, and C3 are provided in the three floating diffusions FD1, FD2, and FD3, respectively. The three capacitors C1, C2, and C3 are connected to the photodiode PD through the MOS transistors M1, M2, and M3, respectively. The MOS transistors M1, M2, and M3 are subjected to opening/closing control by turning ON/OFF the first, second, and third gate signals Sg1, Sg2, and Sg3 that are input to the respective gates from the gate drive circuit 31.

The photodiode PD receives light from the outside, which is subjected to photoelectric conversion. Charge produced through photoelectric conversion is accumulated in either one of the three capacitors C1, C2, and C3 through a MOS transistor which is among the MOS transistors M1, M2, and M3 and which is controlled so as to enter the open state. Thus, charge corresponding to the amount of light received by the photodiode PD is accumulated in the capacitors C1, C2, and C3. The sensor circuit 3 obtains the amount of received light by accumulating charge in the capacitors C1, C2, and C3 in each pixel circuit 30.

The amounts of received light which is obtained in the capacitors C1, C2, and C3 in a pixel circuit 30 are read through analog signal lines when the pixel circuit 30 is selected by a selection signal Ss. The selection signal Ss is a signal that selects a target pixel circuit 30 from which the amounts of received light are to be read, from among the multiple pixel circuits 30. The capacitors C1, C2, and C3 discharge the charge having been accumulated, for reset by applying a reference voltage VR by using reset signals Sr1, Sr2, and Sr3. The reset signals Sr1, Sr2, and Sr3 are received, for example, from the gate drive circuit 31.

Referring to FIG. 3, the vertical scan circuit 32 is a circuit that performs vertical scanning on the pixel circuits 30 disposed in a matrix, in reading of the amounts of received light from the pixel circuits 30. The vertical scan circuit 32 sequentially outputs the selection signal Ss to each group of pixel circuits 30 arranged in line.

The horizontal reading circuit 33 is a circuit that reads the amounts of received light in pixel circuits 30 scanned by the vertical scan circuit 32, to the TOF signal processor 4. The horizontal reading circuit 33 includes multiple A/D (analog/digital) converters 35, and performs conversion (A/D conversion) from the amounts of received light as analog values which are obtained from the pixel circuits 30, into digital count values. Three A/D converters 35 are preferably provided, for example, for the pixel circuits 30 in each row. Each of the amounts of received light which are obtained in the capacitors C1, C2, and C3 in the pixel circuits 30 is subjected to A/D conversion. The count values obtained through A/D conversion performed on the amounts of received light are output to the range calculator 42 (see FIG. 1) of the TOF signal processor 4.

Operations of the range image sensor 1 according to the present preferred embodiment will be described below.

A non-limiting example of a method of calculating the range to a target, which is performed by the range image sensor 1, will be described with reference to FIGS. 5A to 6D. FIGS. 5A to 5E include timing charts of operation timings at which light is emitted and received in the range image sensor 1. FIG. 5A illustrates a timing of the emission control signal to control emission of LED light. FIG. 5B illustrates a timing at which reflected light reaches the range image sensor 1 from the target. FIGS. 5C-5E illustrate timings of the first, second, and third gate signals Sg1, Sg2, and Sg3, respectively, that are input to a pixel circuit 30. FIGS. 6A to 6D include schematic diagrams for describing the method of calculating a range, which is performed by the range image sensor 1.

The emission control signal illustrated in FIG. 5A is supplied from the timing generator 41 to the LED 2 (see FIG. 1). Based on the emission control signal, LED light of pulse waveform having a pulse width of a given time period Tp starts being emitted at time t1. The time period Tp is, for example, equal to or larger than about 10 nanoseconds (ns) and equal to or less than about 20 nanoseconds. A target is illuminated with LED light so that reflected light from the target is produced. The reflected light from the target reaches the range image sensor 1 with a delay from a time point of the emission of LED light in accordance with the range to the range image sensor 1.

A delay time period for the reflected light from the target illustrated in FIG. 5B with respect to the LED light emitted in the illumination operation is denoted as Td, and the reflected light reaches the range image sensor 1 at time t2 at which the delay time period Td has elapsed from time t1. The waveform of the reflected light has a pulse width of the time period Tp that is the same or substantially the same as that of the LED light. In the present preferred embodiment, it is presumed that the delay time period Td is less than the time period Tp, for example.

As described below, based on the gate signals Sg1 to Sg3 illustrated in FIGS. 5C to 5E, the sensor circuit 3 according to the present preferred embodiment receives extraneous light, such as background light, for example, in a stop time period during which emission of LED light is stopped, and receives reflected light from the target in a time division manner in synchronization with an emission time period during which LED light is emitted.

The gate signals Sg1, Sg2, and Sg3 are sequentially output from the gate drive circuit 31 of the sensor circuit 3 to a pixel circuit 30 disposed on the light-receiving surface, in synchronization with the emission control signal (see FIG. 3). In the pixel circuit 30, based on the gate signals Sg1, Sg2, and Sg3, charge produced in accordance with the amount of received light in the photodiode PD is accumulated in the capacitors C1, C2, and C3 (see FIG. 4B). Charge produced in the photodiode PD during a time period during which charge corresponding to the amount of received light is not accumulated in the capacitors C1, C2, and C3 is discharged to the outside through a drain gate that is not illustrated.

The first gate signal Sg1 illustrated in FIG. 5C is ON during the time period Tp before emission of LED light. While the first gate signal Sg1 is ON, charge corresponding to the amount of light received by the photodiode PD is accumulated in the capacitor C1. FIG. 6A illustrates the amount Q1 of received light which is caused by the first gate signal Sg1 and which is accumulated in the capacitor C1. The amount Q1 of received light is the amount of extraneous light received in a state in which reflected light of the LED light is not produced. The amount Q1 of received light is obtained in order to check an effect of extraneous light, such as background light, irrelevant to LED light.

The second gate signal Sg2 illustrated in FIG. 5D is ON during a time period from time t1 at which emission of LED light is started until time t3 at which the emission is stopped. While the second gate signal Sg2 is ON, charge corresponding to the amount of light received by the photodiode PD is accumulated in the capacitor C2. FIG. 6B illustrates the amount Q2 of received light that is caused by the second gate signal Sg2 and that is accumulated in the capacitor C2. The amount Q2 of received light includes a reflected light component that derives from the reflected light arriving during the time period Tp from time t1 at which emission of LED light starts. In addition, the amount Q2 of received light includes an extraneous light component, such as background light (see FIGS. 7A to 7E).

The third gate signal Sg3 illustrated in FIG. 5E is ON during a time period Tp spanning from time t3 after emission of LED light is stopped. While the third gate signal Sg3 is ON, charge corresponding to the amount of light received by the photodiode PD is accumulated in the capacitor C3. FIG. 6C illustrates the amount Q3 of received light which is caused by the third gate signal Sg3 and which is accumulated in the capacitor C3. The amount Q3 of received light includes a reflected light component that derives from the reflected light arriving continuously during a time period from time t3 at which emission of LED light is stopped until time t4 after the delay time period Td has elapsed. Thus, the entire amount of received reflected light is divided in a time division manner. The amounts obtained through division are distributed as a reflected light component of the amounts Q2 and Q3 of received light in accordance with the delay time period Td. It is presumed that the delay time period Td of reflected light is less than the time period Tp. Time t4 at which reception of the reflected light is ended is within the charging time period Tp for the capacitor C3. Similarly to the amount Q2 of received light, the amount Q3 of received light also includes an extraneous light component. The length of a time period during which LED light is emitted is not necessarily the same as the length of a time period during which each of the gate signals Sg1, Sg2, and Sg3 is ON.

As described above, in the range image sensor 1, the sensor circuit 3 receives light during a given time period from the start of the emission time period of LED light. Then, charge corresponding to the amounts Q2 and Q3 of received light is accumulated in the capacitors C2 and C3 (first capacitors). In addition, light is received during a stop time period during which emission of LED light is stopped, and charge corresponding to the amount Q1 of received light is accumulated in the capacitor C1 (a second capacitor). Charge accumulated in each of the capacitors C1, C2, and C3 is detected. Thus, the amounts Q1, Q2, and Q3 of received light are obtained. According to the amounts Q1, Q2, and Q3 of received light corresponding to charge accumulated in the capacitors C1, C2, and C3, respectively, as illustrated in FIG. 6D, a ratio of the delay time period Td of reflected light from a target with respect to the time period Tp corresponds to a ratio of the amount of reflected light distributed to the amount Q3 of received light with respect to the entire amount of received reflected light. Therefore, the delay time period Td may be obtained based on distribution between the amounts Q2 and Q3 of received light.

As illustrated in FIGS. 6B and 6C, the amounts Q2 and Q3 of received light include not only a reflected light component but also an extraneous light component. The amounts Q2 and Q3 of received light are obtained during the time period Tp whose length is the same as the time period length for the amount Q1 of received light including only extraneous light. Therefore, the amount of the extraneous light component included in the amounts Q2 and Q3 of received light may be equal or substantially equal to the amount Q1 of received light. Accordingly, in the present preferred embodiment, the amount Q1 of received light is subtracted from the amounts Q2 and Q3 of received light appropriately. Thus, the amount of the received reflected light component excluding the amount of the extraneous light component is calculated. The amount Q1 of received light is obtained just before the amounts Q2 and Q3 of received light are obtained. Therefore, the amount of the extraneous light component in the amounts Q2 and Q3 of received light may be excluded with high accuracy by using the amount Q1 of received light.

The delay time period Td is the time required until LED light reaches a target and returns back as reflected light to the range image sensor 1. That is, the delay time period Td is the time taken for a round trip in the range between a target and the range image sensor 1 at light speed c. Accordingly, Td=2L/c holds where L represents the range to a target. Therefore, the range L to a target may be calculated by computing the following expression.

$$L=(c/2)\times Tp\times\{(Q3-Q1)/(Q2+Q3-2\times Q1)\} \quad (1)$$

Operations of generating a range image according to the present preferred embodiment will be described with reference to FIGS. 7A to 7E. FIG. 7A is a diagram for describing operations of generating a range image for one frame. FIGS. 7B to 7D illustrate timing charts of the first, second, and third gate signals Sg1, Sg2, and Sg3 during a cumulative time period in FIG. 7A. FIG. 7D illustrates a timing chart of the drain gate during the cumulative time period in FIG. 7A. The drain gate is a gate that discharges charge from the photodiode PD.

The range image sensor 1 according to the present preferred embodiment, which is preferably mounted, for example, in a mobile device, repeatedly generates a range image at a frame rate equal to or larger than a given frame rate in order to detect an operation using a user gesture or other operation. The given frame rate is, for example, equal to or less than about 30 fps and equal to larger than about 60 fps, and is preferably about 30 fps in this example. As illustrated in FIG. 7A, a time period in which a range image for one frame is generated includes two time periods, the cumulative time period and a reading time period. In the cumulative time period, a series of the above-described operations in which pulsed LED light is emitted and in which the reflected light is received are repeatedly performed a given number of times so that the amount of received light is cumulated. In the reading time period, the cumulative amounts of received light are read.

The cumulative time period includes light-receiving time periods, the number of which is equal to the number of operations of emitting pulsed LED light. A light-receiving time period is a time period in which the pixel circuits 30 receive light. In one light-receiving time period, as illustrated in FIGS. 7B to 7D, the first, second, and third gate signals Sg1, Sg2, and Sg3 are sequentially turned ON (see FIG. 5). As illustrated in FIG. 7E, the drain gate enters the open state in the time periods other than the light-receiving time periods in a cumulative time period, and discharges charge obtained through photoelectric conversion in the photodiode PD. In a cumulative time period, charge is repeatedly accumulated in the capacitors C1, C2, and C3 based on the first, second, and third gate signals Sg1, Sg2, and Sg3. Thus, each of the amounts Q1, Q2, and Q3 of received light (see FIG. 6) is cumulated. The number of cumulative operations for each of the amounts Q1, Q2, and Q3 of received light in a cumulative time period is hereinafter referred to as a "cumulative number".

In the reading time period after a cumulative time period, the controller 40 of the TOF signal processor 4 reads the count values of the amounts Q1, Q2, and Q3 of received light, which are cumulated in each of the pixel circuits 30 from A/D converters of the sensor circuit 3. The range calculator 42 of the controller 40 performs a calculation using Expression (1) based on the count values of the amounts Q1, Q2, and Q3 of received light for each of the pixel circuits 30. The cumulative amounts Q1, Q2, and Q3 of received light improve statistical accuracy of a measured range, enabling a range to be calculated with high accuracy.

The range calculator 42 performs, on a pixel, the calculation using Expression (1) described above so that range data indicating a range for the pixel is obtained. The TOF signal processor 4 obtains range data for all pixels so that a range image for one frame is generated.

When the range image sensor 1 is mounted in a mobile device in order to detect a gesture, a frame rate equal to or larger than a given value, such as 30 fps, is required, and it is preferable that power consumption be reduced. Further, it is anticipated that the mobile device is used indoors and outdoors. It is important to take measures against outdoor background light, such as sunlight. Measures against background light which are taken in the operations of generating a range image according to preferred embodiments of the present invention will be described below.

Measures against background light according to the present preferred embodiment will be described with reference to FIGS. 8A to 8C. FIGS. 8A to 8C are diagrams for describing operations performed by the range image sensor 1 in accordance with a change in background light. FIG. 8A illustrates operations of generating a range image for one frame in the normal state. FIG. 8B illustrates operations for one frame when the intensity of background light is increased from the state in FIG. 8A. FIG. 8C illustrates operations for one frame when the intensity of background light is further increased from the state in FIG. 8B.

Strong background light, such as sunlight, causes problems in the measurement of a range using a range image outdoors. In the present preferred embodiment, in the calculation using Expression (1) in which the amount Q1 of received light is used, an extraneous light component caused by background light is removed from the amounts Q2 and Q3 of received light. However, when the amount of received light in which strong background light is cumulated becomes large, even with the calculation using Expression (1) in which the amount Q1 of received light is used, the effect of optical shot noise depending on the magnitude of the cumulative amount of received light remains. In addition, under a condition of strong background light, in operations of cumulating the amounts Q1, Q2, and Q3 of received light, the capacitors C1, C2, and C3 are saturated, causing a considerable reduction in the accuracy of measurement of a range. On the other hand, when the capacitance value of a capacitor is set large so that the capacitor will not be saturated even under a condition of strong background light, not only is the size of the sensor device increased, but a count value for the A/D converters 35 is also allocated in accordance with the large capacitance value. Therefore, under a condition of weak background light, the accuracy of measurement of a range is decreased. Accordingly, in the present preferred embodiment, the intensity of background light is monitored when a range image is to be generated. In accordance with the magnitude of the amount of received background light, the cumulative number used when a new range image is to be generated is changed.

As illustrated in FIG. 8A, to ensure sufficiently high accuracy of measurement of a range in the normal state, the cumulative number is set to a large value, such as 20000, for example. The cumulative number used in the normal state may be set to an appropriate value, for example, in consideration of a tradeoff between a frame rate and power consumption as well as the accuracy of measurement of a range.

When strong background light is detected, as illustrated in FIG. 8B, the cumulative number is decreased. For example, the cumulative number is decreased to 15000. Thus, the cumulative amount of received light for one frame is decreased, and saturation of the capacitors C1, C2, and C3 is prevented. At that time, a reduction of the cumulative number causes a frame rate at which a range image is generated to increase. Even after the cumulative number is changed, background light is monitored.

When the amount of received background light monitored in the state in FIG. 8B is further increased, as illustrated in FIG. 8C, the cumulative number is further decreased. In this stage, when the cumulative number is continuously decreased in accordance with the intensity of background light, not only an extraneous light component in the amount of received light but also a received-light component is decreased, resulting in a reduction in the accuracy of measurement of a range. Therefore, a reduction of the cumulative number which causes a large frame rate is utilized so that, when a frame rate of a given value or more, such as 30 fps, for example, is obtained with certainty, range images for multiple frames (for example, two or three frames) are averaged for output. Averaging of range images may significantly reduce or prevent a reduction in the accuracy of measurement of a range.

When the amount of received background light is decreased to a degree at which a risk of saturation is eliminated, the decreased cumulative number is restored in the reverse order. Thus, when background light weakens after background light strengthens, for example, when the range image sensor 1 is moved from the outside to the inside, accuracy of measurement of a range may be recovered while saturation of the amount of received light is prevented. A process of generating a range image, in which the above-described measures against background light are performed, will be described below.

Figure 9:
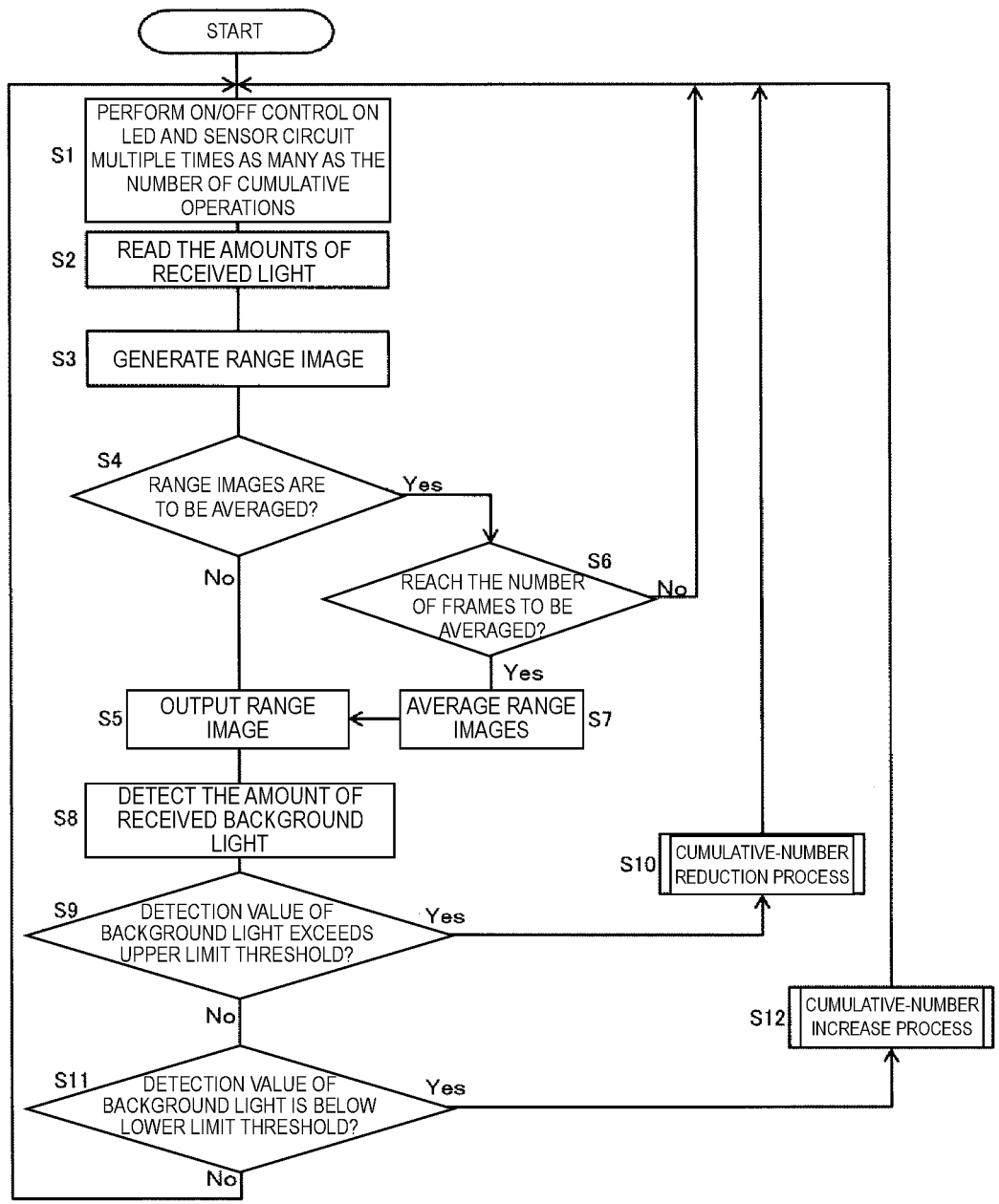
FIG. 9 is a flowchart of a process of generating a range image, according to the first preferred embodiment of the present invention.

A process of generating a range image, which is performed by the range image sensor 1, according to the present preferred embodiment will be described with reference to FIGS. 9, 10A, and 10B. FIG. 9 is a flowchart of the process of generating a range image according to the present preferred embodiment. FIG. 10A illustrates a data table D1 used in the process of generating a range image. FIG. 10B illustrates a table for describing averaging of range images.

The process according to the flowchart is performed by the controller 40 of the TOF signal processor 4.

The controller 40 controls the timing generator 41 so that pulsed LED light is emitted multiple times, up to as many as a predetermined cumulative number. In addition, the controller 40 performs ON/OFF control on the LED 2 and the sensor circuit 3 so that the cumulative amounts Q1, Q2, and Q3 of received light (see FIGS. 6A to 6D) are obtained (S1).

The controller 40 reads, from the sensor circuit 3, the count values of the cumulative amounts Q1, Q2, and Q3 of received light which are obtained through the ON/OFF control performed multiple times, up to as many as the cumulative number, for each pixel (S2).

The controller 40 causes the range calculator 42 to calculate a range by using Expression (1) based on the read count values of the amounts of received light, and a range image is generated (S3).

The controller 40 determines whether or not averaging of generated range images are to be performed (S4). The determination in step S4 is made based on the cumulative number. For example, in the case illustrated in FIG. 8A, since the cumulative number is larger than a given value (for example, 12000), it is determined that averaging of range images does not need to be performed (NO in S4), and the process proceeds to step S5. A case in which range images are to be averaged will be described below.

The controller 40 outputs a range image for one frame from the range image output circuit 43 to an external device (S5).

The controller 40 detects the amount of received background light based on the amounts of received light that are read in step S2 (S8). In the present preferred embodiment, the controller 40 uses the amount Q1 of received light cumulated in the capacitor C1 of each pixel circuit 30 to determine the magnitude of the amount of received background light. The controller 40 uses the maximum value of the amounts Q1 of received light for all of the pixel circuits 30, as a detection value of background light.

The controller 40 determines whether or not the detection value of background light exceeds a threshold LA (S9). The threshold LA is a threshold indicating that the cumulative amount of received light is a value close to saturation, and is defined using the upper limit of the amount of received light which may be accumulated in the capacitors C1, C2, and C3. For example, the threshold LA is preferably set to about 90% of the maximum accumulation amount of the capacitor C1.

When the detection value of background light exceeds the threshold LA, the amount of received light for one of the pixel circuits 30 exceeds the threshold LA. Accordingly, the possibility of causing saturation of the capacitors C1, C2, and C3 is high. Therefore, if the controller 40 determines that the detection value of background light exceeds the threshold LA (Yes in S9), the controller 40 performs the cumulative-number reduction process (S10).

The cumulative-number reduction process is a process of reducing the cumulative number for range images generated for the next frame in accordance with an increase in the intensity of background light, and providing settings to average range images. In the present flow, the controller 40 uses the data table D1 stored in the storage 44 to perform the cumulative-number reduction process.

As illustrated in FIG. 10A, the data table D1 manages a mode, a cumulative number, an averaging setting flag, the number of frames to be averaged, and frame rates before and after the averaging. The mode is set in order to reduce the cumulative number for each single frame from one stage to the next stage. In FIG. 10A, for example, five modes are defined. The states illustrated in FIGS. 8A to 8C indicate operations in mode 1, 2, and 3, respectively. The averaging setting flag is a flag indicating whether or not range images are to be averaged. In this example, under the assumption that the threshold for the cumulative number is set to 12000, the averaging setting flag is set. The number of frames to be averaged is the number of range image frames obtained as targets to be averaged, when range images are to be averaged.

The cumulative-number reduction process is performed by changing the set mode to a mode in the stage whose number is larger by 1, in the data table D1. For example, if the detection value exceeds the threshold LA (Yes in S9) when the process in mode 1 illustrated in FIG. 8A is being performed, the controller 40 reads the data table D1 and makes a transition from mode 1 to mode 2 (S10), and performs the processes in step S1 and its subsequent steps again in mode 2 (see FIG. 8B).

In mode 2 in the data table D1, the cumulative number smaller than that in mode 1 and an averaging setting flag of "OFF (not to be averaged)" are set. Therefore, in step S1 after the transition to mode 2, the cumulative number is decreased. In step S4, the controller 40 refers to the averaging setting flag in the data table D1, causes the process to proceed to "No", and outputs the generated range image for one frame (S5).

If the detection value exceeds the threshold LA again (Yes in S9) in the case illustrated in FIG. 8B (mode 2), in the cumulative-number reduction process in step S10, a transition from mode 2 to mode 3 is made (see FIG. 8C). In mode 3 in the data table D1, an averaging setting flag of "ON (to be averaged)" is set. Therefore, when the transition to mode 3 is made, range images are averaged in the processes in steps S4, S6, and S7.

When range images are to be averaged, the controller 40 causes the process to proceed to "Yes" based on the averaging setting flag in step S4, and determines whether or not the number of generated range image frames reaches the number of frames to be averaged, in the data table D1 (S6). The controller 40 repeatedly performs processes in step S1 and subsequent steps until the number of generated range image frames reaches the number of frames to be averaged (No in S6), and records the generated range images in the storage 44.

If the number of generated range image frames reaches the number of frames to be averaged (Yes in S6), the controller 40 causes the averaging processor 45 to average the range images (S7).

The table illustrated in FIG. 10B illustrates exemplary range data before and after averaging of range images. As illustrated in FIG. 10B, range images are averaged in each pixel, (x1, y1), (x2, y2), . . . , of the range images so that the average of pieces of range data, the number of which is equal to the number of frames to be averaged, is calculated. The averaging processor 45 may calculate the average of range data in an actual distance unit or in the number of bits. The calculated averages are used as range data of the averaged range images so that variations of range data for each frame are smoothed, improving accuracy of measurement of a range.

In the state of mode 3 which is illustrated in FIG. 10A, the number of frames to be averaged is set to "2". Therefore, as illustrated in FIG. 10B, range images for two frames are averaged (S7), and the averaged range image is output (S5). Therefore, as illustrated in FIG. 10A, the frame rate (i.e., about 30.35 fps) after the averaging is half the frame rate (i.e., about 60.7 fps) before the averaging. In the data table D1, the number of frames to be averaged is preferably set so that the frame rate after averaging is equal to or larger than about 30 fps, for example. Thus, by referring to the data table D1, the cumulative-number reduction process is performed so that a range image being output at a frame rate equal to or larger than about 30 fps is assured.

If the controller 40 determines that the detection value of background light does not exceed the threshold LA (No in S9), the controller 40 determines whether or not the detection value of background light is below a threshold LB (S11). The threshold LB is a lower limit threshold indicating that the cumulative amount of received light has a sufficiently large margin from the upper limit for saturation. The threshold LB is set so that, even when the cumulative number is restored to the number before reduction, the detection value is less than the threshold LA.

When the detection value of background light is below the threshold LB, the amounts of received light for all of the pixel circuits 30 are below the threshold LB. Even when the setting of the cumulative number is restored, the capacitors C1, C2, and C3 will not be saturated. Therefore, if the controller 40 determines that the detection value of background light is below the threshold LB (Yes in S11), the controller 40 performs the cumulative-number increase process (S11).

The cumulative-number increase process is a process of increasing the cumulative number for range images generated for the next frame in accordance with a decrease in the intensity of background light. In the flow, the cumulative-number increase process is performed by changing the set mode to a mode in the stage whose number is smaller by 1, in the data table D1 illustrated in FIG. 10A. Thus, for example, when background light decreases after background light strengthens, the accuracy of measurement of a range may be recovered without saturation of the capacitors C1, C2, and C3.

If the controller 40 determines that the detection value of background light is not below the threshold LB (No in S11), the controller 40 repeatedly performs processes in step S1 and its subsequent steps in the set mode.

According to the above-described process, under a condition of strong background light, by using the mode of the data table D1, the cumulative number is reduced from one stage to the next stage. When background light weakens, the cumulative number is increased. Therefore, a reduction in the accuracy of measurement of a range due to a change in the intensity of background light is effectively reduced or prevented. In addition, range images are averaged in accordance with the setting of the cumulative number. Thus, while a frame rate at which range images are output is maintained at a value equal to or larger than a given value, such as about 30 fps, for example, a reduction in the accuracy of measurement of a range is reduced or prevented.

In the above description, the amount of received background light is preferably detected (step S8) after output of a range image in step S5. However, a timing at which the processes in step S8 and its subsequent steps are performed is not limited to a timing after step S5. The processes in steps S8 to S12 may be performed before step S5. For example, the processes may be performed after reading of the amounts of received light in step S2.

In the above description, in the processes in steps S10 and S12, the mode in the data table D1 illustrated in FIGS. 10A and 10B is preferably changed one stage at a time. This is not limiting. For example, the number of modes with which change is made in accordance with the detection value of background light is calculated, and the mode may be changed for one frame by the multiple stages.

In the above-described process, in the cumulative-number reduction process and the cumulative-number increase process in steps S10 and 12, the data table D1 is preferably referred to. Instead of use of the data table D1, a calculation setting a cumulative number may be performed. In the description below, by using FIGS. 11 and 12, a modified example of the cumulative-number reduction process and the cumulative-number increase process will be described.

Figure 11:
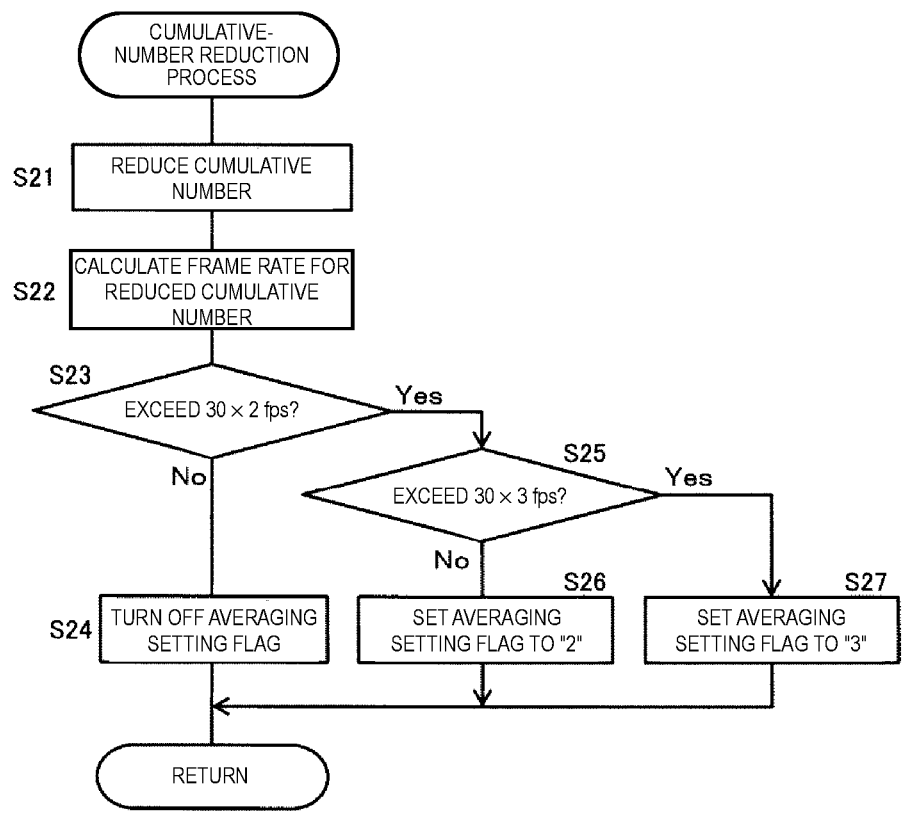
FIG. 11 is a flowchart of a modified example of a cumulative-number reduction process performed by a range image sensor according to the first preferred embodiment of the present invention.

FIG. 11 is a flowchart of a modified example of the cumulative-number reduction process. The process described below is performed in step S10 in FIG. 9.

The controller 40 performs a calculation to decrease the cumulative number (S21). The calculation process may preferably be performed, for example, by multiplying the set cumulative number by a given value (for example, 0.75) less than 1, or by subtracting a given number (for example, 1000) from the set cumulative number. In addition, based on the difference between the detection value of background light and the threshold LA, a cumulative number may be calculated so that the detection value is equal to or less than the threshold LA.

Based on the time period per cumulative operation (one period for emission of LED light) and the reading time period in which the amounts of received light are read, the controller 40 calculates a frame rate obtained when range images, the number of which is equal to the calculated cumulative number, are generated (S22).

The controller 40 determines whether or not the calculated frame rate exceeds twice the value of 30 fps (S23), for example. If the calculated frame rate does not exceed twice the value of 30 fps (No in S23), the controller 40 sets the averaging setting flag recorded in the storage 44 to "OFF (not to be averaged)" (S25).

In contrast, if the calculated frame rate exceeds twice the value of 30 fps (Yes in S23), the controller 40 determines whether or not the calculated frame rate exceeds three times the value of 30 fps (S25). If the calculated frame rate does not exceed three times the value of 30 fps (No in S25), the controller 40 sets, to "2", the number of frames to be averaged, which is recorded in the storage 44 (S26).

In contrast, if the calculated frame rate exceeds three times the value of 30 fps (Yes in S25), the controller 40 sets, to "3", the number of frames to be averaged, which is recorded in the storage 44 (S27). Similarly in steps S23 and S25, it may be determined whether or not the calculated frame rate exceeds N times the value of 30 fps (N=4, 5, . . . ).

After any one of steps S24, S26, and S27, the controller 40 performs the processes in step S1 and its subsequent steps in FIG. 9.

The above-described process enables the cumulative number to be calculated in accordance with an increase in the intensity of background light, and enables saturation of the amounts of received light to be prevented. In addition, based on the calculated cumulative number, while a frame rate of 30 fps or more is maintained, settings for averaging of range images may be made.

Figure 12:
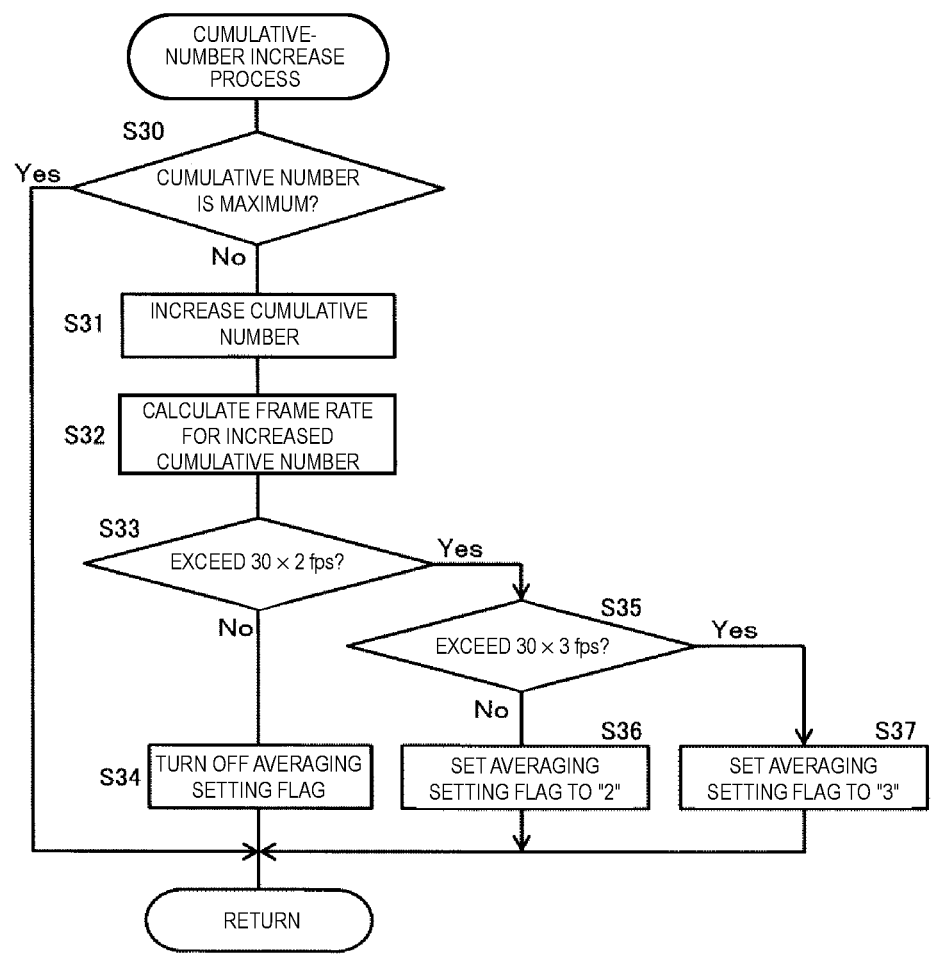
FIG. 12 is a flowchart of a modified example of a cumulative-number increase process performed by a range image sensor according to the first preferred embodiment of the present invention.

FIG. 12 is a flowchart of a modified example of the cumulative-number increase process. As described above, when the cumulative-number reduction process illustrated in FIG. 11 is performed in step S10 in FIG. 9, the cumulative-number increase process is performed in step S12 in FIG. 9 as illustrated in FIG. 12.

The controller 40 determines whether or not the set cumulative number is the maximum cumulative number (S30). The maximum cumulative number is set, for example, so that a frame rate until a range image is generated is not below 30 fps. If the set cumulative number is the maximum cumulative number (Yes in S30), the controller 40 does not change the setting of the cumulative number, and causes the process to return back to step S1 in FIG. 9.

In contrast, if the set cumulative number is not the maximum cumulative number (No in S30), the controller 40 performs a calculation to increase the cumulative number (S31). The calculation process in step S31 uses a calculation expression corresponding to the calculation process performed in step S21 in FIG. 11. For example, when a given number (for example, 1000) is subtracted from the set cumulative number in step S21, the same number (for example, 1000) is added to the set cumulative number in step S31.

Similarly in step S22, the controller 40 calculates a frame rate obtained when range images, the number of which is equal to the calculated cumulative number, are generated (S32). In steps S33, 34, 35, 36, and 37, similar processes to those in steps S23, 24, 25, 26, and 27, respectively, are performed, and the process returns back to step S1.

The above-described process enables the decreased cumulative number to be restored by using a calculation expression corresponding to the calculation to decrease the cumulative number, and enables accuracy of measurement of a range to be recovered in accordance with a decrease in the intensity of background light.

In the above description, in the case where the calculated frame rate exceeds twice or three times a frame rate having a given value, the number of frames to be averaged is set to "2" or "3". Setting of the number of frames to be averaged is not limited to this. In the case where the calculated frame rate exceeds N times a frame rate having the given value (N=4, 5, . . . ), the number of frames to be averaged may be set to "N".

In the above description, a frame rate corresponding to the cumulative number calculated in steps S21 and S31 is calculated (S22, S32). Based on the calculated frame rate, the number of frames to be averaged is determined (S23 to 27, S33 to 37). However, a frame rate is not necessarily calculated. For example, the number of frames to be averaged which corresponds to the cumulative number calculated in steps S21 and S31 may be specified by using the data table in which the cumulative number is associated with the number of frames to be averaged (and the averaging setting flag).

To check the effects of the range image sensor 1 according to the present preferred embodiment, an experiment using the range image sensor 1 was performed. By referring to FIGS. 13A, 13B and 14, the experiment performed by using the range image sensor 1 will be described below.

Figure 13A:
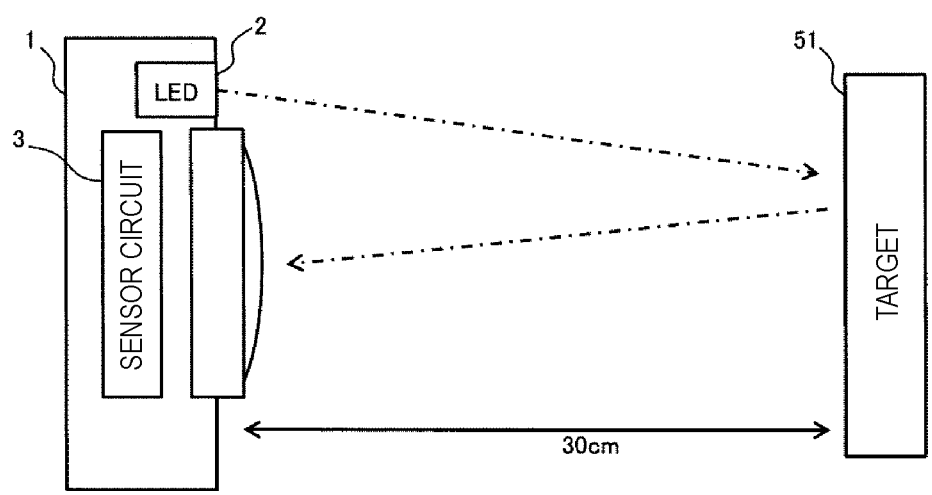
FIGS. 13A and 13B include diagrams for describing an experiment using a range image sensor according to a preferred embodiment of the present invention.
Figure 13B:
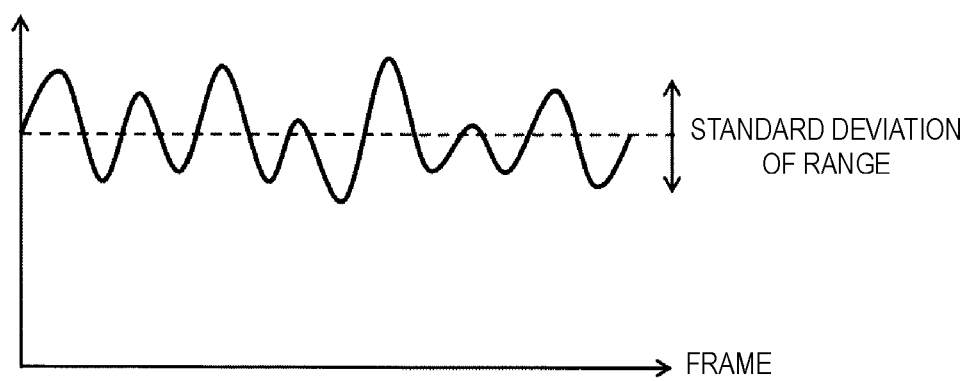

FIG. 13A is a schematic diagram illustrating the positional relationship between the range image sensor 1 and a target in the experiment. FIG. 13B is a graph indicating the standard deviation of ranges in each range image frame. FIG. 14 is a table indicating conditions and results of the experiment using the range image sensor 1.

In the experiment, as illustrated in FIG. 13A, a target 51 was disposed at a distance of about 30 cm from the range image sensor 1, and the range to the target 51 was measured by using the range image sensor 1. The measurement of a range was performed under the following three conditions A, B, and C (see FIG. 14).

(1) Condition A is the initial condition. Under condition A, the cumulative number is 20000 (the number of operations of emitting LED light is also 20000). Range images were not averaged.

(2) Condition B is a condition in which the cumulative number is simply decreased under condition A. Under condition B, the cumulative number is 12000 (the number of operations of emitting LED light is also 12000). Range images were not averaged.

(3) Condition C is a condition in which averaging is performed under condition B. Under condition C, the cumulative number is 12000 (the number of operations of emitting LED light is also 12000). Two range image frames were averaged.

In the experiment, under condition A, the range to the target 51 was measured for 20 frames (i.e., twenty times), and the standard deviation of the ranges was calculated for the measured frames (see FIG. 13B). Under condition B, similarly to condition A, the range to the target 51 was also measured for 20 frames (i.e., twenty times), and the standard deviation of the ranges was calculated for the measured 20 frames (see FIG. 13B). Finally, under condition C, each exclusive set of continuous two frames was averaged using the ranges for 40 frames which were measured under condition B, and the standard deviation of the ranges was calculated for the 20 averaged frames.

FIG. 14 illustrates the standard deviation of the ranges which was calculated under each of conditions A, B, and C, as well as a ratio of the measured count value with respect to the saturation count value, and the frame rate. The measured count value is a count value obtained through A/D conversion on the amount of received light which is cumulated for one frame in measurement of each condition in the experiment. The saturation count value is a count value indicating the upper limit of the amount of received light.

As illustrated in FIG. 14, under condition B, the cumulative number is decreased to 12000, so that the frame rate is larger than that under condition A, and a ratio of the measured count value with respect to the saturation count value, that is, the signal amount indicating a reflected light component is half the signal amount under condition A. Therefore, condition B is unlikely to produce saturation as compared with condition A. In contrast, due to the influence of a reduction of the signal amount, the standard deviation of the ranges under condition B is increased to about 18.7 mm which is larger than that under condition A which is about 12.9 mm.

In contrast, under condition C, each set of two frames is averaged so that the standard deviation of ranges is improved to about 14.4 mm as compared with the standard deviation under condition B. It is confirmed that variations in measured ranges may be reduced or prevented. The signal amount under condition C is not different from that under condition B before averaging. In contrast, averaging of two frames causes the frame rate under condition C to be twice the frame rate under condition B. However, since the frame rate under condition B is large, 30 fps is maintained.

As described above, for example, a range is measured with a large cumulative number, such as the cumulative number under condition A. At that time, in the case where it is expected that a problem such as saturation will arise, not only is the cumulative number simply decreased as in condition B, but also frames are preferably averaged as in condition C. Thus, a range may be measured with high accuracy. Further, a decrease in the cumulative number enables the frame rate to be increased. Accordingly, while measures against background light are taken, a frame rate equal to or larger than a given value (such as 30 fps, for example) may be maintained.

As described above, the range image sensor 1 according to the present preferred embodiment includes the LED 2, the sensor circuit 3, the controller 40, and the range calculator 42. The LED 2 repeatedly emits LED light onto the target 5.

The sensor circuit 3 receives light during a given time period from the start of an emission time period of the LED light. The controller 40 controls the LED 2 and the sensor circuit 3 so that each of the amounts Q1, Q2, and Q3 of light received by the sensor circuit 3 is cumulated in synchronization with emission of LED light. The range calculator 42 generates a range image indicating the range to the target 5 based on the cumulative amounts Q1, Q2, and Q3 of received light. The controller 40 changes the cumulative number that is the number of operations in which the sensor circuit 3 cumulates each of the amounts Q1, Q2, and Q3 of received light, in accordance with the magnitude of the cumulative amount Q1 of received light.

The range image sensor 1 changes the cumulative number in accordance with the magnitude of the amount of received light which is cumulated by the sensor circuit 3. Therefore, excessive cumulation of the amount of received light under a condition of strong background light is prevented, and a reduction in accuracy of measurement of a range is decreased or prevented.

In the range image sensor 1, when the magnitude of the cumulative amount Q1 of received light exceeds the given threshold LA, the controller 40 decreases the cumulative number. Thus, every time the magnitude of the cumulative amount Q1 of received light exceeds the threshold LA, the cumulative number is decreased, so as to achieve a step-by-step suppression in the reduction in accuracy of measurement of a range. In addition, the threshold LA is defined, for example, by using the upper limit of the amounts Q1, Q2, and Q3 of received light. Thus, every time the magnitude of the cumulative amount Q1 of received light exceeds the threshold LA, the cumulative number is decreased, thus reducing or preventing saturation of the amounts Q1, Q2, and Q3 of received light.

In the range image sensor 1, when the frame rate at which the range calculator 42 generates a range image for one frame exceeds an integer multiple, which is equal to two or more, of a frame rate having a given value, the range calculator 42 may average, for output, range images for frames, the number of which is an integer. Thus, an increase in the frame rate which is caused by a decrease in the cumulative number is utilized so that, while a frame rate for output range images remains at a given value or more, multiple range images are averaged, so as to decrease or prevent a reduction in accuracy of measurement of a range.

A frame rate having the given value is preferably equal to or larger than about 30 fps and equal to or less than about 60 fps, for example. Thus, for example, it is possible to output range images for a moving picture which may follow a user gesture or other motion.

The range image sensor 1 may preferably further include the storage 44 which stores the data table D1 in which the cumulative number is associated with the number of frames for which range images are to be averaged. In this case, the controller 40 refers to the data table D1 and changes the cumulative number in accordance with the magnitude of the cumulative amount Q1 of received light. Thus, control is easily performed such that settings of the cumulative number and the number of frames for which range images are to be averaged are made based on the data table D1.

In the range image sensor 1, the controller 40 may perform a calculation so as to set the cumulative number in accordance with the magnitude of the cumulative amount Q1 of received light. Thus, the cumulative number may be set in accordance with the magnitude of the cumulative amount Q1 of received light when appropriate.

In the range image sensor 1, the sensor circuit 3 may preferably include the multiple first capacitors C2 and C3 that receive light in a time division manner during a given time period from the start of an emission time period of LED light, and that accumulate charge corresponding to the amounts Q2 and Q3 of received light, respectively, which are obtained in a time division manner. Thus, a range may be calculated by using the amounts Q2 and Q3 of received light which are obtained in a time division manner.

In the range image sensor 1, the sensor circuit 3 may preferably include the second capacitor C1 that receives light in a stop time period in which emission of LED light is stopped, and that accumulates charge corresponding to the amount Q1 of light received in the stop time period in which emission of LED light is stopped. Thus, the amount Q1 of only received background light which does not include reflected light of LED light may be obtained.

Second Preferred Embodiment

In the first preferred embodiment, as measures against background light, the cumulative number is changed in accordance with the magnitude of the cumulative amount of received light. In a second preferred embodiment, in addition to a reduction of the cumulative number in the first preferred embodiment, the light-receiving time period per pulse illumination with LED light is further decreased. A range image sensor according to the present preferred embodiment will be described below.

An overview of operations of generating a range image according to the present preferred embodiment will be described with reference to FIGS. 15A, 15B, 16A to 16H, and 17A to 17F.

FIG. 15A is diagram for describing normal operations of generating a range image in the present preferred embodiment, and FIG. 15B is a diagram for describing operations of generating a range image when background light is strong in the present preferred embodiment. In the present preferred embodiment, the light-receiving time period is preferably reduced in combination with a reduction of the cumulative number in the first preferred embodiment. As illustrated in FIGS. 15A and 15B, when the amount of received light is cumulated multiple times, as many as a specific cumulative number, a reduction of the light-receiving time period causes the amount of charge accumulated per pulse illumination with LED light to be reduced, thus achieving a reduction of the amount of received light which is obtained after the cumulating operations. Therefore, when strong background light is detected, a reduction of the light-receiving time period is combined with a reduction of the cumulative number. This achieves a wider range of a reduction of the amount of received light to reduce or prevent saturation.

FIG. 16A is a timing chart of the drain gate before a reduction of the light-receiving time period. FIGS. 16B-16D are timing charts of the first, second, and third gate signals Sg1 to Sg3, respectively, before a reduction of the light-receiving time period. FIG. 16E is a timing chart of the drain gate after a reduction of the light-receiving time period. FIGS. 16F-16H are timing charts of the first, second, and third gate signals Sg1 to Sg3, respectively, after a reduction of the light-receiving time period.

In the present preferred embodiment, without changing the period of pulse illumination with the LED light, the light-receiving time period is reduced. As illustrated in FIG. 16E, before and after a reduction of the light-receiving time period, a time period during which the drain gate is in the closed state is increased by the difference between the length of the reduced time period during which the drain gate is in the open state and the length of the open-state time period before the reduction. Thus, the period is maintained constant. At that time, as illustrated in FIGS. 16B to 16D and 16F to 16H, a time period during which the first, second, and third gates are in the open state is reduced by the identical width.

In the present preferred embodiment, for example, the light-receiving time period is preferably set to two stages. A first open gate time-period T1 is a time period during which each of the first, second, and third gate signals is ON, before a reduction of the light-receiving time period. A second open gate time-period T2 is a time period during which each of the first, second, and third gate signals is ON, after a reduction of the light-receiving time period, and is shorter than the first open gate time-period T1.

FIG. 17A is a waveform diagram illustrating an exemplary waveform of LED light. FIG. 17B is a waveform diagram illustrating an exemplary waveform of reflected light of LED light. FIGS. 17C and 17D illustrate ON/OFF timings of the second and third gate signals before a reduction of the light-receiving time period. FIGS. 17E and 17F illustrate ON/OFF timings of the second and third gate signals after a reduction of the light-receiving time period.

In the example illustrated in FIG. 17A, the waveform of LED light includes gentle slopes in the rising edge and the falling edge of a pulse, and includes an intensity near a peak value in a shorter time period Tp' than the time period Tp during which the emission control signal (see FIG. 5A) for LED light is ON. In this case, as illustrated in FIG. 17B, a time period during which reflected light of LED light has an intensity near a peak value is also Tp'. A large portion of the amount of received reflected light is obtained in the time period Tp' included in the time period Tp. Therefore, when background light is strong, the amount of received light obtained during a time period other than the time period Tp' included in the time period Tp may contain only a small amount of a reflected light component, and may primarily contain an extraneous light component caused by background light.

In the present preferred embodiment, the first open gate time-period T1 based on the time period Tp is set in the normal state, and is changed to the second open gate time-period T2 based on the time period Tp' in accordance with an increase in background light. Thus, when background light is weak, reflected light having a width of the time period Tp is fully received, achieving sufficient accuracy of a range. In addition, when background light is strong, an extraneous light component in the amount of received light is efficiently reduced, and an increase in optical shot noise and saturation of the amount of received light are able to be reduced or prevented.

A process of generating a range image according to the present preferred embodiment will be described with reference to FIGS. 18, 19, and 20.

Figure 18:
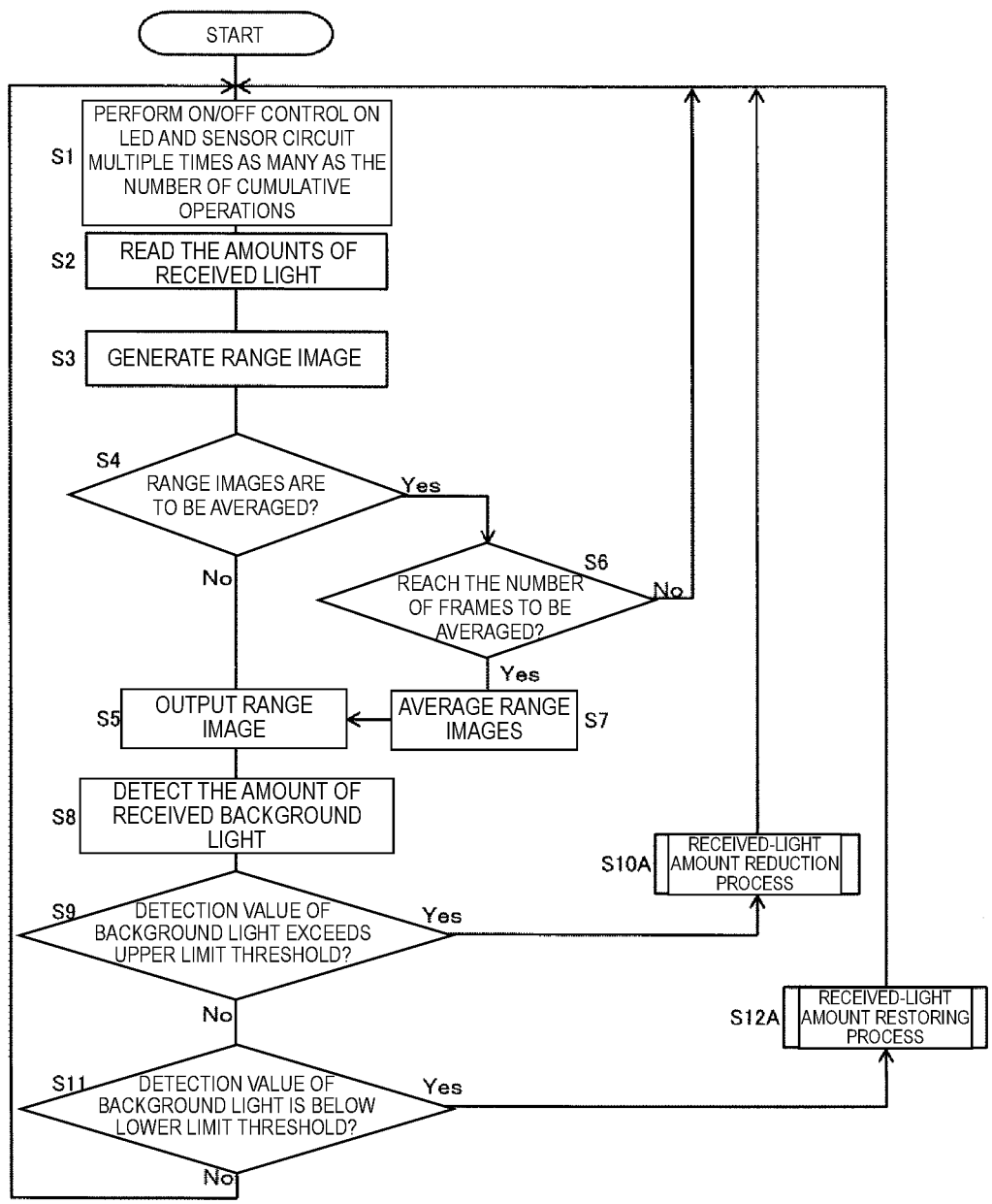
FIG. 18 is a flowchart of a process of generating a range image, according to the second preferred embodiment of the present invention.

FIG. 18 is a flowchart illustrating the process of generating a range image according to the present preferred embodiment. As illustrated in FIG. 18, in the present preferred embodiment, instead of the processes in steps S10 and 12 in FIG. 9, a received-light amount reduction process (S10A) and a received-light amount restoring process (S12A) are performed. The received-light amount reduction process is a process in which the following operations are performed in accordance with an increase in the intensity of background light: a reduction of the light-receiving time period; a reduction of the cumulative number; and setting for a reduction of the amount of received light through averaging of range images. The received-light amount restoring process is a process in which, in accordance with a decrease in the intensity of background light, settings having been made in the received-light amount reduction process are restored and the amount of received light is restored.

Figure 19:
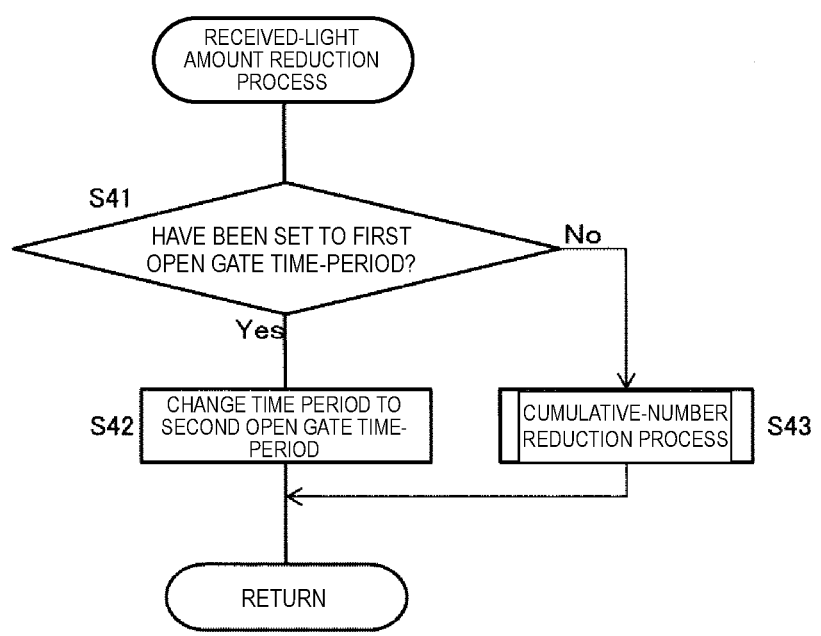
FIG. 19 is a flowchart of a received-light amount reduction process performed by the range image sensor according to the second preferred embodiment of the present invention.

FIG. 19 is a flowchart of the received-light amount reduction process. The process illustrated in FIG. 19 is performed by the controller 40 in step S10A in FIG. 18.

The controller 40 determines whether or not the light-receiving time period has been set to the first open gate time-period T1 (see FIGS. 16A to 16H) (S41). The setting for the light-receiving time period is managed, for example, by using a given flag in the storage 44.

If the light-receiving time period has been set to the first open gate time-period T1 (Yes in S41), the controller 40 changes the setting to the second open gate time-period T2 (S42).

In contrast, if the light-receiving time period has not been set to the first open gate time-period T1 (No in S41), the controller 40 performs the cumulative-number reduction process because the light-receiving time period has already been reduced (S43). The cumulative-number reduction process in step S43 may be performed using the data table D1 illustrated in FIG. 10A, or may be performed by performing the calculation to decrease the cumulative number as illustrated in FIG. 11.

The controller 40 performs the processes in step S42 or S43, and then causes the process to return back to step S1 in FIG. 18.

In the received-light amount reduction process described above, the light-receiving time period is first reduced, and a reduction of the cumulative number and averaging of range images are then performed. A reduction of an open gate time-period is unlikely to affect accuracy of measurement of a range as compared with a reduction of the cumulative number. Therefore, the received-light amount reduction process enables a reduction in accuracy of measurement of a range due to strong background light to be efficiently reduced or prevented.

Figure 20:
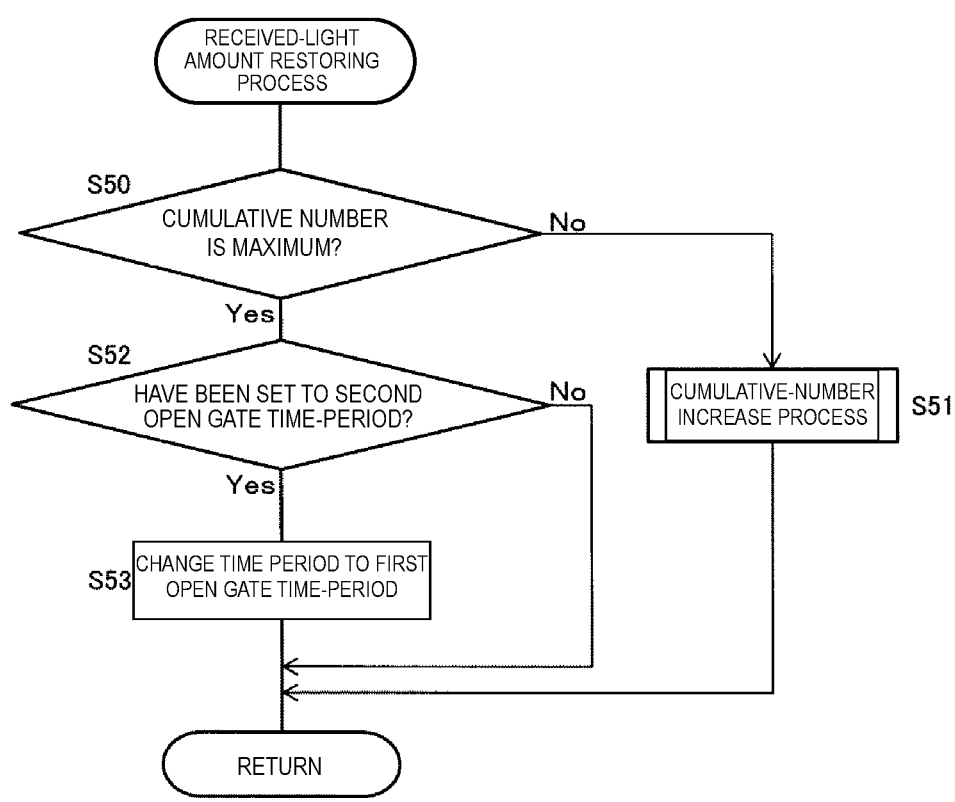
FIG. 20 is a flowchart of a received-light amount restoring process performed by the range image sensor according to the second preferred embodiment of the present invention.

FIG. 20 is a flowchart of the received-light amount restoring process. The process illustrated in FIG. 20 is performed by the controller 40 in step S12A in FIG. 18.

The controller 40 determines whether or not the set cumulative number is the maximum cumulative number (S50). If the set cumulative number is not the maximum cumulative number (No in S50), the controller 40 performs the cumulative-number increase process so that the settings having been made in the cumulative-number reduction process in step S43 in FIG. 19 are restored (S51).

In contrast, if the set cumulative number is the maximum cumulative number (Yes in S50), the controller 40 determines whether or not the light-receiving time period has been set to the second open gate time-period T2 (see FIGS. 16A to 16H) (S52). If the light-receiving time period has not been set to the second open gate time-period T2 (No in S52), no settings are changed and the process returns back to step S1 in FIG. 18 because the first open gate time-period T1 has already been set.

In contrast, if the light-receiving time period is set to the first open gate time-period T1 (Yes in S52), the controller 40 changes the setting to the second open gate time-period T2 (S53).

The controller 40 performs the process in step S51 or S53, and then causes the process to return back to step S1 in FIG. 18.

The received-light amount restoring process described above is used to restore, step by step, various settings that have been changed in the received-light amount reduction process. When background light enters the weak state from the strong state, accuracy of measurement of a range is recovered.

As described above, in the range image sensor 1 according to the present preferred embodiment, the controller 40 preferably changes the light-receiving time period that is a time period during which the sensor circuit 3 receives light in synchronization with an emission time period per illumination operation with LED light, in accordance with the magnitude of the cumulative amount Q1 of received light. Thus, under a condition of strong background light, the amount of received light including background light is reduced, and higher accuracy of measurement of a range may be maintained with respect to a change in the intensity of background light.

In the range image sensor 1, when the magnitude of the cumulative amount Q1 of received light exceeds a given threshold, the controller 40 reduces the light-receiving time period. When, in the reduced light-receiving time period, the magnitude of the cumulative amount of received light exceeds the given threshold LA, the cumulative number may be reduced. Thus, under a condition of strong background light, the light-receiving time period is first reduced, and the cumulative number is then reduced. Therefore, a reduction in accuracy of measurement of a range for strong background light is effectively reduced or prevented.

In the above-described preferred embodiments, the range image sensor 1 preferably performs the process of averaging range images (step S7) in FIGS. 9 and 18. Alternatively, the controller 6 may preferably perform the process. In this case, the range image sensor 1 performs steps S1 to S3, and sequentially transmits range images generated in step S3 to the controller 6. Then, the range image sensor 1 performs the processes in steps S8 to S12. On the other hand, every time the controller 6 receives a range image from the range image sensor 1, the controller 6 performs the processes in steps S4 to S7, and performs the function of the averaging processor. The controller 6 performs a given process based on the averaged range image.

The controller 6 may set the number of frames to be averaged. For example, every time the controller 6 receives a range image from the range image sensor 1, the controller 6 may measure the frame rate, and may set the number of frames to be averaged, based on the measurement result.

Based on a range image from the range image sensor 1, the controller 6 may determine the range to a target reflected in the range image and may detect a motion, or may perform image processing to detect a three-dimensional shape. The controller 6, for example, performs display control of a device in which the controller 6 is mounted, by using a detection result based on a range image.

In the above-described preferred embodiments, as a monitor for background light, the amount Q1 of received light which is cumulated in the capacitor C1 dedicated to extraneous light is preferably used. Instead of the amount Q1 of received light, the amounts Q2 and Q3 of received light which are cumulated in the capacitors C2 and C3 may be used. For example, for each frame, the amount of received light which is larger among the amounts Q2 and Q3 of received light may be used to monitor the cumulative amount of received light including a reflected light component. In accordance with the magnitudes of the amounts Q1, Q2, and Q3 of received light which are cumulated for each frame, the cumulative number for the next frame is changed. Thus, while saturation of the amounts Q1, Q2, and Q3 of received light is prevented, a range image may be generated.

When only background light is monitored by using the amount Q1 of received light, for example, an increase/decrease in the amount of received light due to a change in the range to a target may be differentiated. It is effective, for example, in the case where a mode setting dedicated to strong background light is provided.

In the above-described preferred embodiments, the maximum value of the amounts of received light in all of the pixel circuits 30 in the sensor circuit 3 is preferably extracted as the detection value. The method of monitoring the amount of received light is not limited to this. For example, the maximum value of the amounts of reflected light in some pixel circuits 30 of all of the pixel circuits 30 may be extracted as the detection value. In addition, instead of extraction of the maximum value of the amounts of received light, multiple values may be obtained through sampling, and each of the obtained values may be compared with the thresholds LA and LB. For example, in a comparison with the threshold LB, when the magnitudes of the amounts of received light in a given number of pixel circuits 30 among all of the pixel circuits 30 are below the threshold LB, the cumulative number may be increased.

In the above-described preferred embodiments, a pixel circuit 30 preferably includes the capacitor C1 dedicated to extraneous light. A pixel circuit in the range image sensor 1 is not limited to this. Alternatively, the capacitor C1 dedicated to extraneous light may be omitted. In this case, in reading from a pixel circuit, the amount of received light containing reflected light may be obtained in a frame and the amount of received extraneous light may be obtained in a different frame. A range image for one frame may be generated from readings of two frames. For example, in two successive frames, pulsed LED light is repeatedly emitted in one of the frames, and charge is accumulated in two capacitors in a time division manner so that the accumulated charge is read by the TOF signal processor 4. Thus, the amount of received light including reflected light is obtained. In the other frame, while emission of LED light is stopped, light is received. Thus, the amount of received extraneous light may be obtained. In this case, the cumulative amount of received light may be monitored using the amount of received extraneous light, or may be monitored using the amount of received light including reflected light.

In the above-described preferred embodiments, the case in which a pixel circuit 30 preferably includes the three capacitors C1, C2, and C3, and in which three kinds of amounts Q1, Q2, and Q3 of received light are obtained in a time division manner is described. Alternatively, the number of capacitors included in a pixel circuit of the range image sensor may be three or more. For example, a pixel circuit may include four or more capacitors, and four or more kinds of amounts Q1, Q2, . . . Qn (n is an integer equal to or larger than four) of received light may be obtained in a time division manner.

In the above-described preferred embodiments, preferably, it is determined whether or not range images are to be averaged based on the averaging setting flag. The averaging setting flag is not necessarily used in switching of whether or not averaging is to be performed. For example, when range images are not to be averaged, the number of frames to be averaged may be set to "1".

In the above-described preferred embodiments, range images for multiple frames are preferably generated and then averaged. The method of averaging range images is not limited to this. For example, the amounts of received light for multiple frames may be averaged, and a range may be calculated based on the averaged amount of received light. Thus, an averaged range image may be obtained.

In the above-described preferred embodiments, in the TOF signal processor 4, the controller 40 preferably includes the range calculator 42 and the averaging processor 45. This is not limiting. In the TOF signal processor 4, the controller 40 may be provided separately from the range calculator 42 and the averaging processor 45.

In the above-described preferred embodiments, LED light is preferably subjected to pulse modulation. The method of modulating LED light is not limited to this. For example, signal strength may be modulated to a sine waveform or other suitable waveforms.

In the above-described preferred embodiments, the exemplary case in which the range image sensor 1 is mounted in a mobile device is described. A mobile device in which the range image sensor 1 is mounted is not particularly limiting. The mobile device may be, for example, a smartphone, a tablet terminal, a notebook-sized PC (personal computer), a digital camera, a wearable terminal, or a cellular phone.

A device in which the range image sensor 1 is mounted is not limited to a mobile device. For example, it may be a monitoring camera or a car-mounted device. Even in this case, the range image sensor 1 may reduce or prevent a reduction in accuracy of measurement of the range to a target, such as a person or a vehicle, even under a condition of strong background light.

In the second preferred embodiment, preferably, without changing the period of pulse illumination with LED light, the light-receiving time period is reduced. The method of reducing the light-receiving time period is not limited to this. Alternatively, adjustment may be made so that the sum of the light-receiving time periods in the cumulative time period in one frame is reduced. For example, the period may be shortened in accordance with reduction per light-receiving time period in a frame, and a dormant time period may be provided at the end.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A range sensor comprising:
    a light source that repeatedly emits illumination light onto a target;
    a light receiver that receives light during a given time period from a start of an emission time period of the illumination light;
    a controller that controls the light source and the light receiver such that an amount of light received by the light receiver is cumulated in synchronization with emission of the illumination light; and
    a range information generator that generates, based on a cumulative amount of received light, range information indicating a range to the target; wherein
    the controller changes a cumulative number in accordance with a magnitude of the cumulative amount of received light, the cumulative number being a number of cumulating operations in which the light receiver cumulates the amount of received light;
    the controller changes a light-receiving time period in accordance with the magnitude of the cumulative amount of received light, the light-receiving time period being a time period during which the light receiver receives light in synchronization with the emission time period per illumination light shot;

when the magnitude of the cumulative amount of received light exceeds a given threshold, the controller reduces the light-receiving time period; and when the magnitude of the amount of received light that is cumulated during the reduced light-receiving time period exceeds the given threshold, the controller reduces the cumulative number.

2. The range sensor according to claim 1, wherein, when the magnitude of the cumulative amount of received light exceeds a given threshold, the controller decreases the cumulative number.

3. The range sensor according to claim 1, further comprising:

an averaging processor that, when a frame rate at which the range information generator generates range information for one frame exceeds an integer multiple of a frame rate having a given value, the integer being equal to two or more, averages the range information for frames, the number of frames being equal to the integer.

4. The range sensor according to claim 3, wherein the frame rate having the given value is equal to or larger than about 30 fps and equal to or less than about 60 fps.

5. The range sensor according to claim 3, further comprising:

a storage that stores a table in which the cumulative number is associated with the number of frames for which the range information is to be averaged; wherein the controller refers to the table and changes the cumulative number in accordance with the magnitude of the cumulative amount of received light.

6. The range sensor according to claim 1, wherein the controller performs a calculation to set the cumulative number in accordance with the magnitude of the cumulative amount of received light.

7. The range sensor according to claim 1, further comprising:

a plurality of first capacitors; wherein the light receiver receives light in a time division manner during the given time period from the start of the emission time period of the illumination light; and the plurality of first capacitors accumulate charge corresponding to respective amounts of received light obtained in the time division manner.

8. The range sensor according to claim 7, further comprising:

a second capacitor; wherein the light receiver receives light during a stop time period in which emission of the illumination light is stopped; and the second capacitor accumulates charge corresponding to the amount of light received during the stop time period of the illumination light.

9. The system according to claim 8, wherein the processor includes an averaging processor, and, when a frame rate at which the range sensor generates the range information for one frame exceeds an integer multiple of a frame rate having a given value, the integer being equal to two or more, the averaging processor averages the range information for frames, the number of which is equal to the integer.

10. The system according to claim 9, wherein the frame rate having the given value is equal to or larger than about 30 fps and equal to or less than about 60 fps.

11. The system according to claim 9, further comprising:

a storage that stores a table in which the cumulative number is associated with the number of frames for which the range information is to be averaged; wherein the controller refers to the table and changes the cumulative number in accordance with the magnitude of the cumulative amount of received light.

12. The range sensor according to claim 1, further comprising:

a capacitor; wherein the light receiver receives light during a stop time period in which emission of the illumination light is stopped; and the capacitor accumulates charge corresponding to the amount of light received during the stop time period of the illumination light.

13. A system comprising:

the range sensor according to claim 1; and a processor that performs a process based on the range information generated by the range sensor.

14. The system according to claim 13, wherein, when the magnitude of the cumulative amount of received light exceeds a given threshold, the controller decreases the cumulative number.

15. The system according to claim 13, further comprising:

a plurality of first capacitors; wherein the light receiver receives light in a time division manner during the given time period from the start of the emission time period of the illumination light; and the plurality of first capacitors accumulate charge corresponding to respective amounts of received light obtained in the time division manner.

16. The system according to claim 13, further comprising:

a capacitor; wherein the light receiver receives light during a stop time period in which emission of the illumination light is stopped; and the capacitor accumulates charge corresponding to the amount of light received during the stop time period of the illumination light.

* * * * *